US012654334B2

(12) United States Patent

Peterson et al.

(10) Patent No.: US 12,654,334 B2

(45) Date of Patent: Jun. 16, 2026

(54) FASTENER INSTALLATION ASSEMBLY, AN END-EFFECTOR TOOL, AND A METHOD

(71) Applicant: The Boeing Company, Arlington, VA (US)

(72) Inventors: Drew Michael Peterson, Mill Creek, WA (US); Yen-Chien Wang, Kenmore, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/052,452

(22) Filed: Feb. 13, 2025

(65) Prior Publication Data

US 2025/0375895 A1     Dec. 11, 2025

Related U.S. Application Data

(60) Provisional application No. 63/658,411, filed on Jun. 10, 2024.

(51) Int. Cl.
B21J 15/32 (2006.01)
B23P 19/00 (2006.01)
(Continued)

(52) U.S. Cl.
CPC ............. B25J 11/008 (2013.01); B21J 15/32 (2013.01); B23P 19/006 (2013.01); B23P 19/06 (2013.01);
(Continued)

(58) Field of Classification Search
CPC .. B25J 11/008; B25J 15/0028; B25J 15/0042; B25J 15/0057; B25J 15/024;
(Continued)

(56) References Cited

U.S. PATENT DOCUMENTS 3,893,217 A * 7/1975 Edmond ................. B23P 19/12
29/407.08
6,073,326 A * 6/2000 Banks ...................... B21J 15/10
227/111
(Continued)

FOREIGN PATENT DOCUMENTS

CN         116372087 A      7/2023
DE    102016125041 A1 *  6/2018 ......... B65G 47/1457
EP         0686458        12/1995

OTHER PUBLICATIONS

European Patent Office Extended Search Report, dated Nov. 19, 2025, regarding Application No. EP25180006.6, 5 pages.

*Primary Examiner* — Jermie E Cozart

(74) *Attorney, Agent, or Firm* — Yee & Associates, P.C.

(57) ABSTRACT

A fastener installation assembly, an end-effector tool, and a method for installing fasteners into respective holes of a workpiece includes a container and retainer assemblies supported by the container. Each of the retainer assemblies include fingers configured to retain a respective one of the fasteners between the fingers in a pre-installed position. A first actuator is configured to move the respective fasteners to an installed position by ejecting the respective one of the fasteners out of the respective retainer assemblies and inserting the respective one of the fasteners into one of the holes of the workpiece. Each of the retainer assemblies include a compliance apparatus configured to allow the respective fasteners and the respective fingers to move independently of each other to self-align the respective fasteners with the respective one of the holes as the first actuator moves the respective fasteners from the pre-installed position to the installed position.

24 Claims, 11 Drawing Sheets

(51) Int. Cl.

| | |
|---|---|
| *B23P 19/06* | (2006.01) |
| *B23P 19/12* | (2006.01) |
| *B25J 11/00* | (2006.01) |
| *B25J 15/00* | (2006.01) |
| *B25J 15/02* | (2006.01) |
| *B21J 15/14* | (2006.01) |

(52) U.S. Cl.
CPC ........... *B23P 19/12* (2013.01); *B25J 15/0057* (2013.01); *B25J 15/024* (2013.01); *B21J 15/142* (2013.01); *B23P 2700/01* (2013.01); *B25J 15/0028* (2013.01); *B25J 15/0042* (2013.01)

(58) Field of Classification Search
CPC ......... B23P 19/006; B23P 19/06; B23P 19/12; B23P 2700/01; B21J 15/142; B21J 15/32
See application file for complete search history.

(56) References Cited

U.S. PATENT DOCUMENTS

| | | | | |
|---|---|---|---|---|
| 10,987,767 | B2 | 4/2021 | Pringle, IV et al. | |
| 2005/0040203 | A1* | 2/2005 | Iannucci | B27F 7/13 |
| | | | | 227/51 |
| 2008/0244888 | A1* | 10/2008 | Sarh | B21J 15/32 |
| | | | | 29/525.01 |
| 2011/0239448 | A1* | 10/2011 | Sarh | B21J 15/14 |
| | | | | 29/700 |
| 2017/0355025 | A1* | 12/2017 | Rola | B25J 9/1687 |
| 2023/0095667 | A1* | 3/2023 | Batt | B21J 15/142 |
| | | | | 29/525.06 |
| 2024/0109120 | A1* | 4/2024 | Oberoi | B21J 15/32 |
| 2024/0181579 | A1* | 6/2024 | Fadlovich | B25J 15/0019 |

* cited by examiner

FASTENER INSTALLATION ASSEMBLY, AN END-EFFECTOR TOOL, AND A METHOD

CROSS-REFERENCE TO RELATED APPLICATION

This application claims the benefit of U.S. Provisional Patent Application Ser. No. 63/658,411, filed Jun. 10, 2024, and entitled "Fastener Installation Assembly, an End-Effector Tool, and a Method," which is incorporated herein by reference in its entirety.

BACKGROUND

Manufacturing processes are used to prepare various workpieces. For example, some workpieces require drilling, deburring, cutting, fastening, etc. These manufacturing processes may be automated using a machine. However, the machine may only insert one fastener in a hole at a time. Furthermore, depending on the size of the workpiece and the size of the machines, the number of machines that may be used to insert each one of the fasteners in the respective holes to prepare the workpiece is limited.

SUMMARY

Therefore, it is desirable to develop a fastener installation assembly, an end-effector tool, and a method that improves manufacturing processes, and other benefits are discussed herein.

The present disclosure provides a fastener installation assembly for installing a plurality of fasteners into respective holes of a workpiece. The fastener installation assembly includes a container and a plurality of retainer assemblies supported by the container. Each of the retainer assemblies include a plurality of fingers configured to retain a respective one of the fasteners between the fingers in a pre-installed position. The fastener installation assembly also includes a first actuator disposed proximal to the container. The first actuator is configured to move the respective fasteners to an installed position by ejecting the respective one of the fasteners out of the respective retainer assemblies and inserting the respective one of the fasteners into one of the holes of the workpiece. Each of the retainer assemblies also include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

The present disclosure also provides an end-effector tool for installing a plurality of fasteners into respective holes of a workpiece. The end-effector tool includes a fixture and a plurality of fastener installation assemblies attached to the fixture in a predetermined pattern. Each of the fastener installation assemblies includes a container and a plurality of retainer assemblies supported by the container. Each of the retainer assemblies include a plurality of fingers configured to retain a respective one of the fasteners between the fingers in a pre-installed position. Each of the retainer assemblies also include a first actuator disposed proximal to the container. The first actuator is configured to move the respective fasteners to an installed position by ejecting the respective one of the fasteners out of the respective retainer assemblies and inserting the respective one of the fasteners into one of the holes of the workpiece. Each of the retainer assemblies also include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

The present disclosure further provides a method of installing a plurality of fasteners into respective holes of a workpiece. One of the fasteners is installed in each of a plurality of retainer assemblies of a container of a fastener installation assembly in a pre-installed position. Each of the retainer assemblies include a plurality of fingers configured to retain a respective one of the fasteners between the fingers in the pre-installed position. One of the fasteners is aligned relative to one of the holes of the workpiece. A first actuator is operated to eject the respective one of the fasteners out of the respective retainer assemblies. The first actuator is disposed proximal to the container. The respective one of the fasteners is inserted into one of the holes of the workpiece to an installed position via the first actuator. Each of the retainer assemblies include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
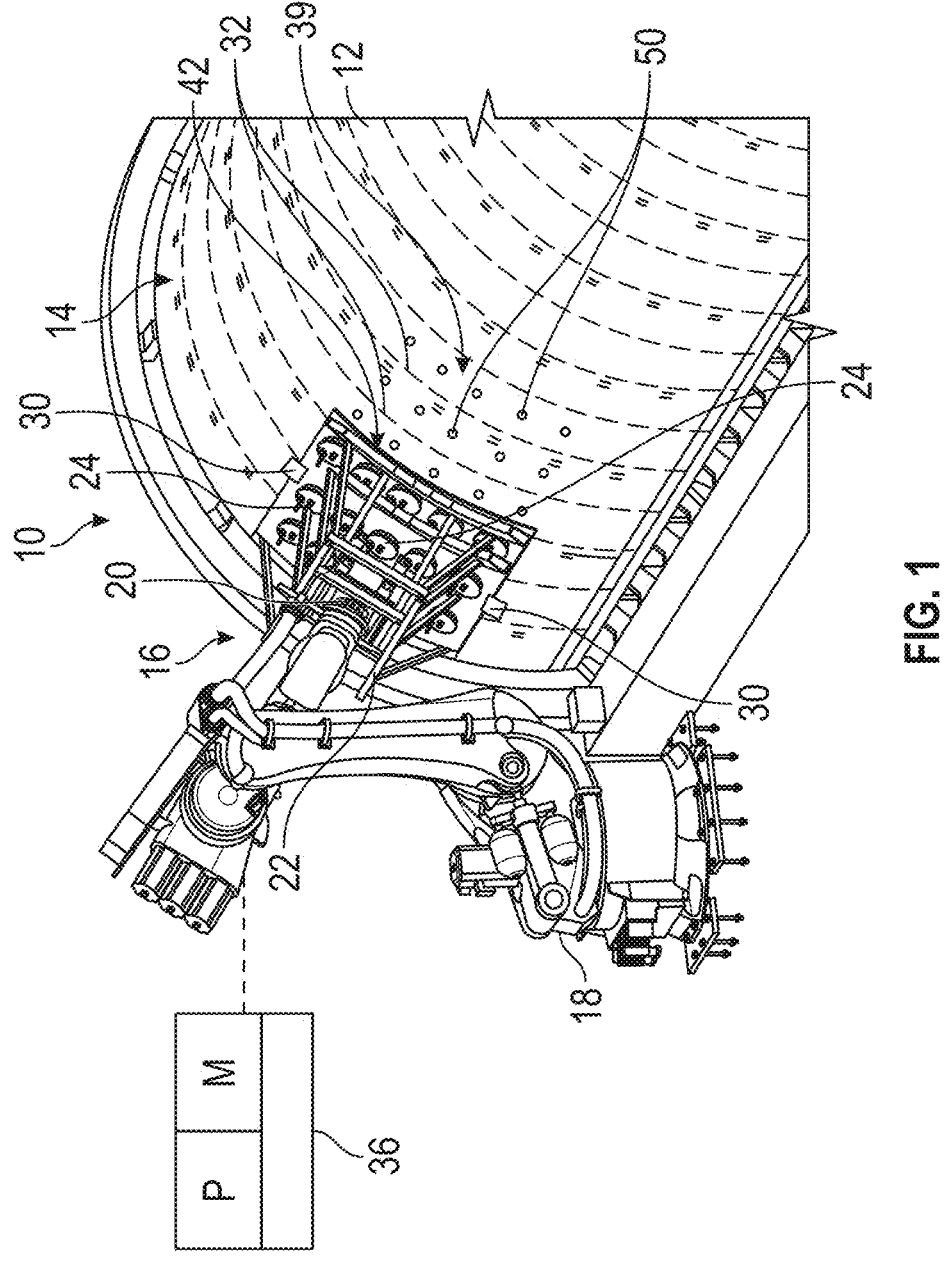
FIG. 1 is a schematic illustration of a machine supporting an end-effector tool having a plurality of process tools being controlled via the machine.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Referring to the figures, wherein like numerals indicate like or corresponding parts throughout the several views, a processing system 10 for manufacturing a component 12 is generally shown in FIG. 1. The processing system 10 may be used to improve manufacturing processes, and also used for other benefits, some of which will be discussed further below.

The processing system 10 described herein may be used to manufacture components 12 of various applications, and non-limiting examples of the applications may include flight vehicles, such as aircraft, drones, payloads, space shuttles, satellites, etc.; movable platforms, such as locomotives, high speed trains, automobiles, off-road vehicles, watercrafts, trailers, farm equipment, etc.; equipment, buildings, or any other applications where the manufacturing processes described herein may be utilized for the components 12.

Continuing with FIG. 1, the component 12 may initially be a workpiece 12 or a plurality of workpieces 12 assembled together or to be assembled together, and the workpiece(s) 12 have one or more manufacturing processes performed thereto to obtain a desired level of completion of the component 12.

The component 12 may be any suitable configuration, and therefore, the workpiece 12 may be any suitable configuration. General non-limiting examples of the components 12 may include one or more panels, skins, frames, brackets, spars, chords, engine cowl, or any other structural members or components that may use the manufacturing processes described herein, and combinations thereof. As non-limiting examples of the components 12 of a flight vehicle application, the components 12 may include one or more of panels, such as wings, fuselages, skins such as skin panels, panels such as inner panels and outer panels, frames, brackets, stringers, bulkheads, keels, ribs, doors, fittings, etc., and combinations thereof.

The processing system 10 described herein allows many different manufacturing processes to be performed to one workpiece 12 and many different workpieces 12. Therefore, depending on the type of the component 12, one or more manufacturing processes may be performed. Generally, the workpiece 12 has a work surface 14, and the various manufacturing processes may be performed to the work surface 14 to obtain the desired level of completion of the component 12. The manufacturing processes may be any suitable process for the desired component 12, and non-limiting examples may include drilling, countersinking, cutting, assembling, fastening, welding, scaling, finishing, lubricating, measuring, probing, joining, splicing, etc., and combinations thereof. Some examples of the manufacturing processes will be discussed below.

Continuing with FIG. 1, the processing system 10 also includes an end-effector tool 16, which is operable to perform various manufacturing processes, as will be discussed further below. To control the end-effector tool 16, a machine 18 may be utilized. Therefore, the end-effector tool 16 may be coupled to the machine 18 such that the machine 18 supports the end-effector tool 16. As such, the processing system 10 utilizes the machine 18 to automate control of the end-effector tool 16. The machine 18 may be configured to operate the end-effector tool 16 and/or move the end-effector tool 16 to a desired location.

The machine 18 may be any suitable configuration to control the end-effector tool 16. As non-limiting examples, the machine 18 may include one or more of a robot, a robotic arm, a computer numerical control (CNC) machine, an automation machine, a factory machine, a crane, a hand lifting assembly, or any other suitable machine 18 that may control the end-effector tool 16 and/or move the end-effector tool 16 to the desired location.

Referring to FIG. 1, the end-effector tool 16 may include a coupler 20 that provides an interface between the end-effector tool 16 and the machine 18. The machine 18 may include a corresponding feature compatible with the coupler 20 such that the machine 18 may attach to and detach from the end-effector tool 16 through the coupler 20. When the machine 18 is attached to the end-effector tool 16 through the coupler 20, the machine 18 may move the end-effector tool 16 to the desired location. The coupler 20 may be any suitable configuration, and non-limiting examples of the coupler 20 may include one or more of quick-connect/disconnect mechanism, eyelets, connectors, clips, fasteners, bolt-on connections, grab-and-go connections, magnets or magnetic connectors, vacuum connectors or vacuum pick and place, etc.

Figure 3:
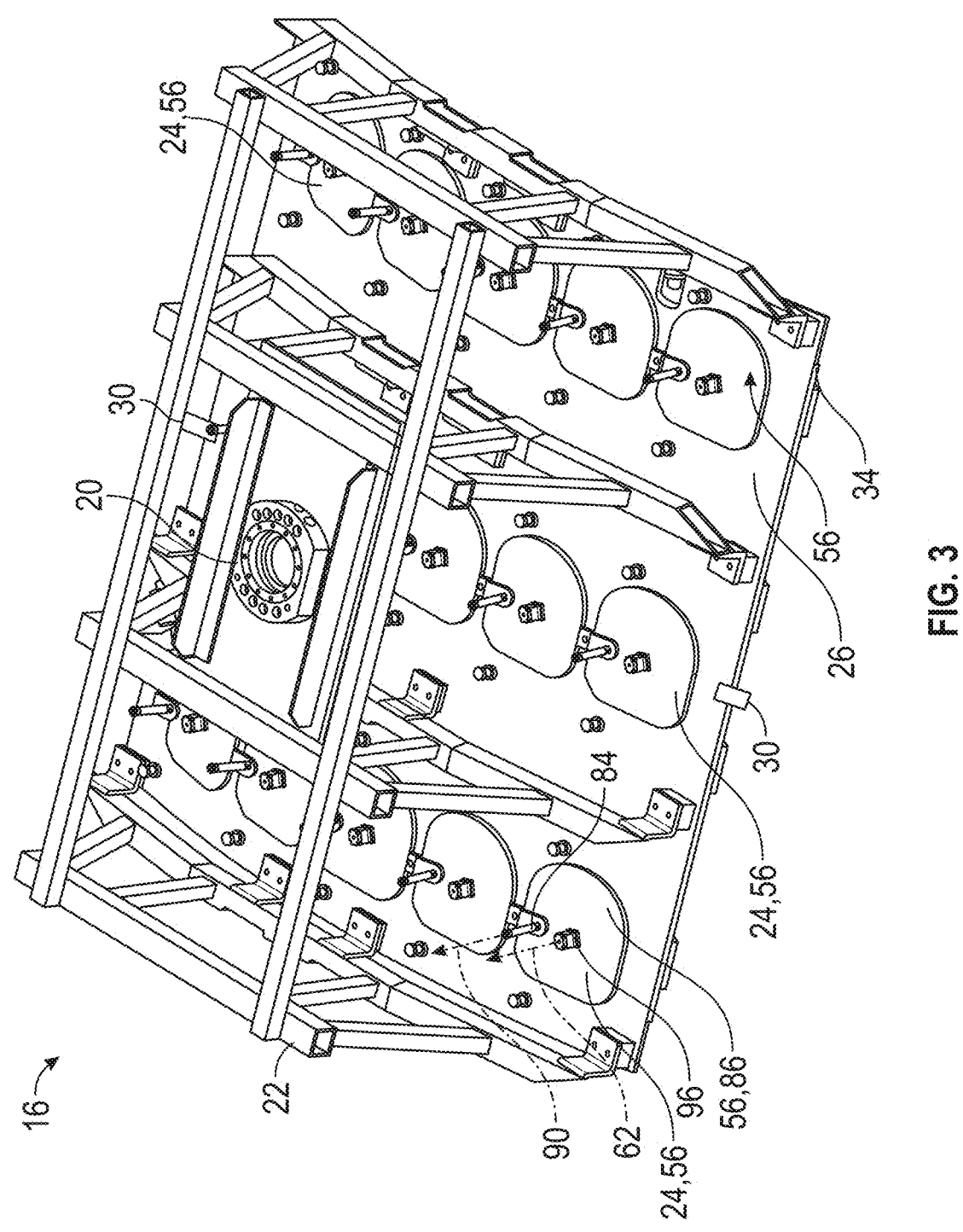
FIG. 3 is a schematic illustration of the end-effector tool of FIG. 1 having a plurality of process tools supported via a fixture.

As best shown in FIGS. 1 and 3, the end-effector tool 16 includes a fixture 22 and the coupler 20 may be attached to the fixture 22. Generally, the fixture 22 supports a plurality of process tools 24. Therefore, multiple manufacturing processes (i.e., the same processes or different processes) may be performed via one machine 18 when the fixture 22 is attached thereto because the fixture 22 is configured to support multiple process tools 24. Using multiple process tools 24 on one end-effector tool 16 may overcome low process rates and/or low volume of processes. As such, using multiple process tools 24 on one end-effector tool 16 may improve production processing systems 10 by improving process rates and/or volume rates. For example, manufacturing process times may be reduced using the processing system 10 described herein, which may increase workpiece 12 output. In addition, using multiple process tools 24 on one end-effector tool 16 may reduce the amount of human interaction needed for one or more of the manufacturing processes. Therefore, the processing system 10 described herein may reduce costs and manufacturing complexities. Example configurations of some of the process tools 24 will be discussed further below.

Continuing with FIG. 3, the process tools 24 may be in any suitable arrangement relative to each other. For example, the process tools 24 may be arranged in rows or columns relative to the fixture 22 and/or the process tools 24 may be offset from each other, etc., depending on the desired locations of the workpiece 12 to be processed.

Referring to FIG. 1, the machine 18 is illustrating holding the end-effector tool 16 relative to the workpiece 12. As also illustrated in this figure, a portion of the fixture 22 is contour complementary to the work surface 14 of the workpiece 12, which assists in positioning of the process tools 24 at the similar contour which correspondingly positions all of the process tools 24 at a consistent distance relative to the work surface 14 of the workpiece 12 before operating the process tools 24. Therefore, for example, if the process tools 24 or part of the process tools 24 are extended toward the work surface 14 to perform an operation to the work surface 14, each of the process tools 24 may move the same distance toward the work surface 14 due to the process tools 24 being positioned complementary to the contour of the work surface 14. It is to be appreciated that, optionally, one or more of the process tools 24 or part of the process tools 24 may move a farther distance, or a shorter distance, toward the work surface 14 than other process tools 24.

As best shown referring to FIG. 1, the work surface 14 and part of the end-effector tool 16 may have matching contours. As such, the work surface 14 may present a first configuration, and this work surface 14 may be worked on to advance processing of the component 12. Turning to FIGS. 1 and 3, the fixture 22 may include a fixture platform 26 having an outer surface 28 presenting a second configuration complementary to the first configuration of the work surface 14. The complementary features of the fixture platform 26 and the work surface 14 may be the surfaces 14, 28 that face each other, as best shown in FIG. 1. That is, the work surface 14 of the workpiece 12 and the outer surface 28 of the fixture platform 26 face each other when the end-effector tool 16 is disposed adjacent to the workpiece 12, as shown in FIG. 1, and it is these surfaces 14, 28 that may generally complement each other. It is to be appreciated that the first configuration of the work surface 14 and the second configuration of the fixture platform 26 may be any suitable configuration, and non-limiting examples may include arcuate, flat, corrugated, angled, tapered, etc.

In certain configurations, the workpiece 12 is the panel of the aircraft, but it is to be appreciated that the workpiece 12 may be other configurations, and the below discussion about the panel is for illustrative purposes. In certain configurations, the panel may be arcuate in a convex orientation and/or a concave orientation, and therefore, the first configuration of the work surface 14 may be arcuate in a convex orientation and/or a concave orientation. Similarly in certain configurations, the second configuration of the outer surface 28 of the fixture platform 26 may be arcuate in a convex orientation and/or a concave orientation opposite of the work surface 14 such that the work surface 14 and the fixture platform 26 are complementary. As such, depending on the orientation of the work surface 14, the fixture platform 26 is configured opposite thereof so that the fixture platform 26 generally complements the work surface 14. Therefore, if the workpiece 12 is the orientation of FIG. 1, the work surface 14 may be arcuate in the convex orientation, and then the fixture platform 26 is complementary to the work surface 14 in the concave orientation so that the fixture platform 26 generally complements the work surface 14.

As mentioned above, the end-effector tool 16 includes process tools 24, and the process tools 24 may be various configurations depending on the desired process or processes to be performed to the workpiece 12. Each of the process tools 24 may be configured to perform the same task or a different task.

For example, the end-effector tool 16 also includes a set of first process tools 24 attached to the fixture 22 in a predetermined pattern. The first process tools 24 are configured to perform a task to the work surface 14. Therefore, the first set of process tools 24 are configured to perform the same task. That is, the first process tools 24 are arranged across the fixture 22 in a template.

In certain configurations, the end-effector tool 16 may also include a set of second process tools 24 attached to the fixture 22 in a predetermined pattern. The second process tools 24 are configured to perform a task to the work surface 14. Therefore, the second set of process tools 24 are configured to perform the same task. That is, the second process tools 24 are arranged across the fixture 22 in a template.

The predetermined pattern or template formed via the process tools 24 across the fixture 22 may be designed to locate the process tools 24 so the processing system 10 may execute operation cycles in accurate positions that match the workpiece 12 design.

In certain configurations, each of the first process tools 24 may be configured to perform one task and each of the second process tools 24 may be configured to perform another task different from the first process tools 24. That is, the first process tools 24 may be configured to perform a first process to the work surface 14 and the second process tools 24 may be configured to perform a second process to the work surface 14.

Optionally, the end-effector tool 16 may incorporate the set of the first process tools 24 as well as the set of the second process tools 24. Therefore, in certain configurations, the set of the second process tools 24 may be attached to the fixture 22 proximal to the set of the first process tools 24. It is to be appreciated that the end-effector tool 16 may incorporate more than the first set and the second set of process tools 24. That is, the end-effector tool 16 may incorporate any suitable number of sets of different process tools 24.

Alternatively, in other configurations, separate end-effector tools 16 may be interchanged with the machine 18. That is, separate end-effector tools 16 may support respective types of the process tools 24. That is, one set of process tools 24 is affixed to the fixture 22 of one end-effector tool 16, and another set of process tools 24 is affixed to the fixture 22 of another end-effector tool 16.

Therefore, optionally, the end-effector tool 16 may be further defined as a first end-effector tool 16 having the first process tools 24, and the processing system 10 may further include a second end-effector tool 16 having the set of second process tools 24. That is, the machine 18 may operate the first end-effector tool 16 for certain workpieces 12 or certain processes and then the machine 18 may disconnect from the first end-effector tool 16 and connect to the second end-effector tool 16 such that the second end-effector tool 16 may operate for certain workpieces 12 or other processes. The first end-effector tool 16 and the second end-effector tool 16 may be interchangeable with each other to perform separate tasks to the work surface 14.

Depending on the configuration of the component 12, different end-effector tools 16 may be required for different components 12. Therefore, in yet other configurations, the first end-effector tool 16 may have the process tools 24 attached to the fixture platform 26 in a different pattern from another first end-effector tool 16 to accommodate different process areas of various workpiece configurations. Similarly, the second end-effector tool 16 may have the process tools 24 attached to the fixture platform 26 in a different pattern from another second end-effector tool 16 to accommodate different process areas of various workpiece configurations. Furthermore, in yet other configurations, the fixture platform 26 of the first end-effector tool 16 may be one configuration to accommodate one work surface configuration, and the fixture platform 26 of another one of the first end-effector tools 16 may be a different configuration to accommodate a different work surface configuration. Similarly, the fixture platform 26 of the second end-effector tool 16 may be one configuration to accommodate one work surface configuration, and the fixture platform 26 of another one of the second end-effector tools 16 may be a different configuration to accommodate a different work surface configuration.

The first process tools 24 and the second process tools 24 may be any suitable tools attachable to the fixture platform 26. It is to be appreciated that referring to the process tools 24 as the first process tools 24 or the second process tools 24 is for illustrative purposes, and therefore, the process tools 24 of FIG. 3 may be referred to as the first process tools 24 or as the second process tools 24.

Figure 2:
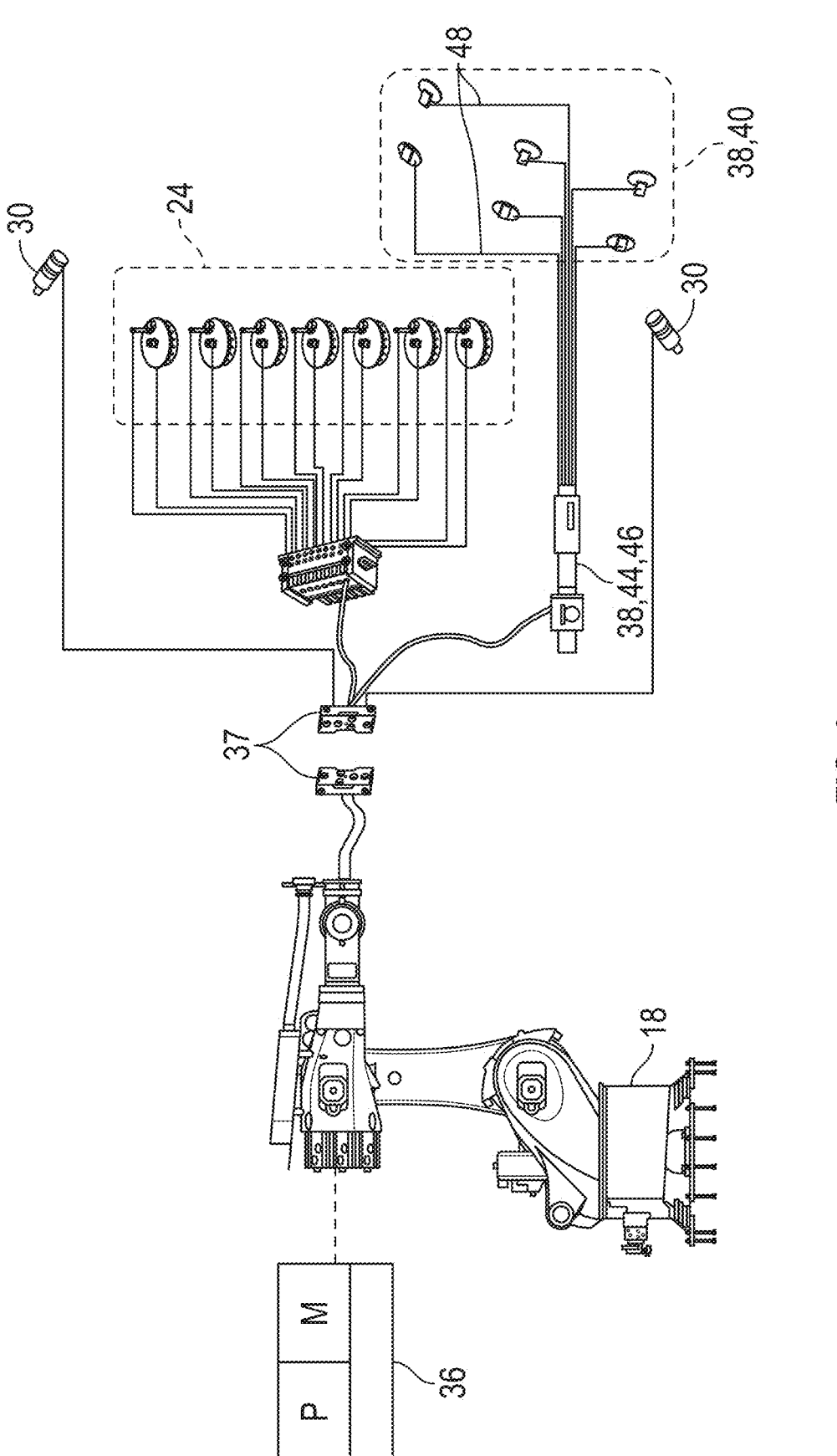
FIG. 2 is a schematic illustration of the process tools, vacuum assembly, and positioning sensors controllable via the machine.

Next, the processing system 10 provides accurate positioning of the end-effector tool 16 relative to the workpiece 12, which may provide consistent manufacturing repeatability. As mentioned above, the machine 18 moves the end-effector tool 16 to the desired position relative to the work surface 14. Referring to FIGS. 1 and 2, the end-effector tool 16 may include a plurality of positioning sensors 30 coupled to the fixture 22. Generally, the positioning sensors 30 are configured to locate the end-effector tool 16 relative to the workpiece 12. More specifically, the positioning sensors 30 are configured to align the end-effector tool 16 relative to the workpiece 12 such that the process tools 24, i.e., the first process tools 24, the second process tools 24, etc., align at a predetermined location. That is, various indexing features may be implemented to ensure the proper placement of the process tools 24 relative to the work surface 14. The placement of the end-effector tool 16 may be recorded and analyzed by utilizing the positioning sensors 30. That is, feedback may be obtained via the positioning sensors 30, which may be used to ensure that the desired placement of the process tools 24 relative to the work surface 14 occurs. For example, in certain configurations, one of the positioning sensors 30 may establish the x, y, z offsets and another one of the positioning sensors 30 may establish the i, j, k offsets.

In certain configurations, the positioning sensors 30 may include a camera assembly, a vision assembly, a laser assembly, a light assembly, a measuring assembly, etc. Therefore, the positioning sensors 30 may include features for vision, infrared, thermo-heat signature, etc., to accurately position/locate the process tools 24 relative to the work surface 14.

Depending on the type of positioning sensors 30 being implemented, the workpiece 12 may optionally include at least one reference guide 32 (see FIG. 1). The reference guide 32 may be implemented in conjunction with the positioning sensors 30 to assist in locating the end-effector tool 16 relative to the workpiece 12. Therefore, the positioning sensors 30 may be configured to identify the reference guide 32 to position the end-effector tool 16 relative to the work surface 14 such that the process tools 24, i.e., the first process tools 24, the second process tools 24, etc., align in the predetermined location.

The reference guide 32 may be any suitable configuration or feature, and non-limiting examples of the reference guide 32 may include lines, marks, etches, stickers, projected patterns, optical reference points such as external optical reference points, magnetic reference targets, etc., disposed on the workpiece 12. One example of external optical reference points is activating one or more lasers to point where the machine 18 should move relative to the workpiece 12, and the positioning sensors 30 of the end-effector tool 16 will locate the laser points to align the process tools 24 relative to the work surface 14. One example of the magnetic reference targets is placing one or more magnets inside of the workpiece 12 or on a backside of the workpiece 12, and the positioning sensors 30 of the end-effector tool 16 will locate the magnets to align the process tools 24 relative to the work surface 14. It is to be appreciated that any suitable number of reference guides 32 may be implemented. The positioning sensors 30 and the reference guides 32 may optionally be implemented instead of indexing holes and corresponding indexing rods, but it is to be appreciated that indexing holes and corresponding indexing rods may optionally be implemented to locate the end-effector tool 16 relative to the workpiece 12.

Generally, the positioning sensors 30 may be attached to the fixture 22. In certain configurations, the positioning sensors 30 may be attached to the fixture platform 26. The positioning sensors 30 may be spaced from each other around the fixture 22, and more specifically, spaced from each other relative to the fixture platform 26. FIGS. 1 and 3 illustrate non-limiting examples of potential locations that the positioning sensors 30 may be attached to the fixture 22/the fixture platform 26. More or less of the positioning sensors 30 may be implemented than as illustrated.

In certain configurations, the fixture platform 26 may include an outer periphery 34, and the outer periphery 34 surrounds the process tools 24. Optionally, the positioning sensors 30 may be disposed proximal to the outer periphery 34, and in certain configurations, the positioning sensors 30 may be attached to the outer periphery 34. By disposing the positioning sensors 30 at the outer periphery 34, the positioning sensors 30 may have a wider range of locating the end-effector tool 16 relative to the workpiece 12 than locating the positioning sensors 30 at other locations. Optionally, the positioning sensors 30 may be movable relative to the fixture 22, and more specifically movable relative to the fixture platform 26 to provide an adjustable range of locating the end-effector tool 16 relative to the workpiece 12. By having the positioning sensors 30 being movable, a wider range of locating, such as a wider range of vision, may be obtained as compared to having fixed positioning sensors.

In certain configurations, the positioning sensors 30 may also be configured to provide quality control of the workpiece 12. That is, the positioning sensors 30 may use vision, infrared, etc., to obtain data about the workpiece 12, and the collected data may be used by other systems to analyze the data and make determinations about the workpiece 12, such as determinations about the quality of the workpiece 12.

To control various features of the processing system 10, a controller 36 may be implemented. Therefore, turning back to FIGS. 1 and 2, the processing system 10 may also include the controller 36 in communication with the end-effector tool 16. The controller 36 may control operation of the machine 18, the process tools 24, and other features, some of which are discussed further below. In addition, the controller 36 may collect data, analyze data, and/or make decisions based on various data. For example, the controller 36 may collect data about the workpiece 12 during any of the manufacturing processes, and be programmed to determine various quality control about the workpiece 12/the component 12. Additional control features of the controller 36 will be discussed further below.

The controller 36 may be in communication with the various features of the end-effector tool 16 via an electrical interface or module 37 (see FIG. 2). The controller 36 may include a processor P configured to execute instructions from a memory M. Processing circuitry may include one or more processors P alone or in combination with one or more memories. The processing circuitry is generally any piece of computer hardware that is configured to process information such as, for example, data, computer programs, and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory M of the same controller 36 or a different controller 36.

The processing circuitry may include a number of processors P, a multi-core processor or some other type of processor, depending on the particular implementation. Further, the processing circuitry may be implemented using a number of heterogeneous processor systems in which a main processor is present with one or more secondary processors on a single chip. As another example, the processing circuitry may be a symmetric multi-processor system containing multiple processors of the same type. Thus, although the processing circuitry may be configured to execute a computer program to perform one or more functions, the processing circuitry of various examples may be configured to perform one or more functions without the aid of a computer program. In either instance, the processing circuitry may be appropriately programmed to perform functions or operations according to example implementations of the present disclosure.

The memory M may be generally any piece of computer hardware that is configured to store information such as, for example, data, computer programs (e.g., computer-readable program code) and/or other suitable information either on a temporary basis and/or a permanent basis. The memory M may include volatile and/or non-volatile memory, and may be fixed or removable. Non-limiting examples of suitable memory M may include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory M may be referred to as a computer-readable storage medium. The computer-readable storage medium may be a non-transitory device configured to store information. Computer-readable medium as described herein may generally refer to a computer-readable storage medium or computer-readable transmission medium.

In addition to the memory M, the processing circuitry may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

Turning back to the end-effector tool 16, the controller 36 may control one machine 18 as well as control the multiple process tools 24 attached to the fixture 22 of the one machine 18. As such, a high rate and/or a high volume of manufacturing processes may be performed by one machine 18 due to the multiple process tools 24 attached to the fixture 22 of one end-effector tool 16, as compared to a machine that has one process tool 24 attached thereto as discussed in the background section above. Due to the compactness of the end-effector tool 16, the machine 18 may have reduced capacities, thus reducing cost. In addition, the machine 18 may allow the use of collaborative machines 18 that have lower payload capacity, which improves manufacturing at a facility.

The controller 36 is configured to control movement of the end-effector tool 16 to position the process tools 24, i.e., the first process tools 24, the second process tools 24, etc., relative to the work surface 14 such that the predetermined pattern is aligned at the predetermined location relative to the work surface 14. The controller 36 is also configured to control operation of the first process tools 24 such that the first process tools 24 perform the task to the work surface 14 to form a first processed area 39 at a predetermined location of the work surface 14. Similarly, the controller 36 is also configured to control operation of the second process tools 24 such that the second process tools 24 perform the task to the work surface 14 to form a second processed area at a predetermined location of the work surface 14. Therefore, the controller 36 is configured to control operation of any number of process tools 24 to form the respective processed area 39.

For illustrative purposes, one processed area 39 is shown in FIG. 1, and identified as the first processed area 39, and the machine 18 is aligning the end-effector tool 16 at another predetermined location to form another processed area, such as the second processed area, and so on depending on the desired number of processed areas 39.

The controller 36 may activate the process tools 24 in any order, and for example, the process tools 24 may be activated individually one at a time, activated in a pattern, each activated simultaneously, or activated in any combination, groupings, etc.

Turning to the positioning sensors 30, the controller 36 may be in communication with the positioning sensors 30 to position the end-effector tool 16 relative to the workpiece 12. For example, the controller 36 may use data from the positioning sensors 30 and/or the reference guide(s) 32 to properly align the process tools 24 relative to the work surface 14. In addition, the controller 36 may use data from the positioning sensors 30 to determine whether the workpiece 12 is within the desired quality control.

Once the process tools 24 are aligned in the predetermined location, features may be implemented to secure and/or stabilize the fixture 22 to the workpiece 12. Therefore, for example, the end-effector tool 16 may also include an end-effector attachment assembly 38 (see FIGS. 2 and 4) configured to engage the workpiece 12 to secure the end-effector tool 16 at the predetermined location. The controller 36 may be in communication with the end-effector attachment assembly 38, and thus, the controller 36 may be used to selectively activate and deactivate the end-effector attachment assembly 38, which will be discussed further below.

Figure 4:
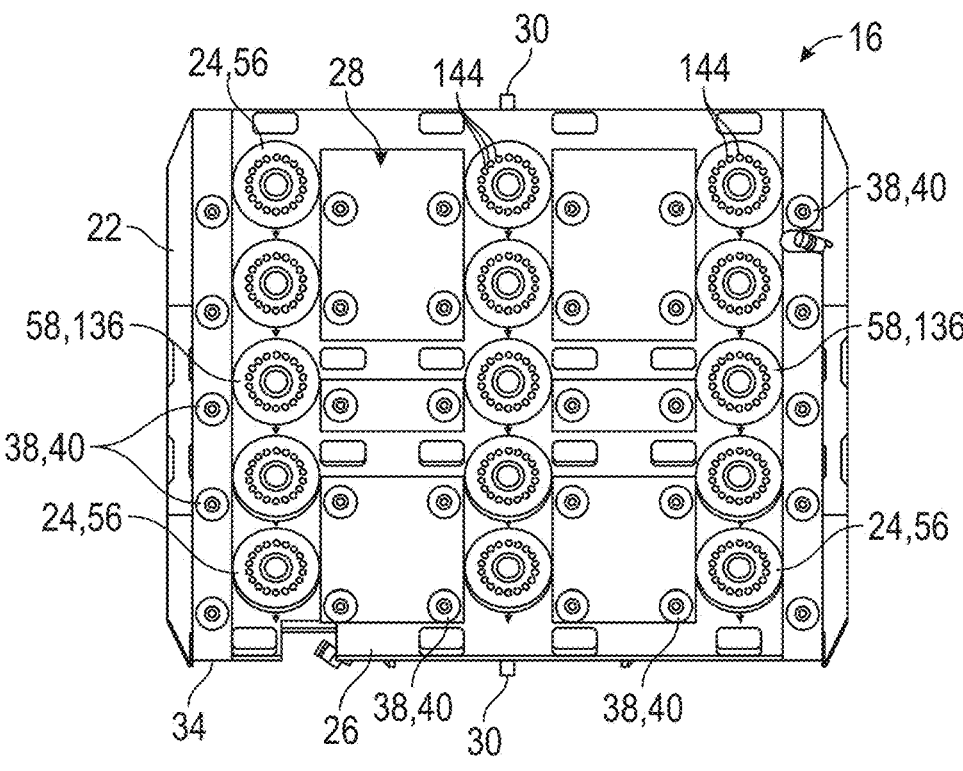
FIG. 4 is a schematic perspective view of a bottom side of the end-effector tool of FIG. 3.

Continuing with FIGS. 2 and 4, the end-effector attachment assembly 38 may include a plurality of holders 40 attached to the fixture 22. The holders 40 are configured to engage the workpiece 12 to attach the end-effector tool 16 to the workpiece 12 so that one or more manufacturing processes may be performed to the workpiece 12 while the end-effector tool 16 is held in place relative to the workpiece 12. In addition, the holders 40 may be configured to absorb energy, dampen vibrations, and/or provide some compliance during operation of the process tools 24 which assists in maintaining the fixture 22, and thus, the process tools 24 in the desired location, and by doing so, reduce or avoid manufacturing distortion of the workpiece 12.

Generally, the holders 40 are spaced from each other around the fixture 22, and more specifically, around the fixture platform 26. The holders 40 may be disposed in a gap 42 (see FIGS. 1 and 11) between the fixture platform 26 and the workpiece 12. That is, the fixture 22 and the fixture platform 26 remain spaced from the workpiece 12 during the manufacturing processes via the holders 40. Any suitable number of holders 40 may be implemented. In certain configurations, the holders 40 are further defined as suction cups. It is to be appreciated that the holders 40 may be any suitable configuration, and suction cups is one example, and other non-limiting examples of the holders 40 may include magnets, fasteners through pre-existing holes, expanding mandrel through pre-existing hole(s), mechanism(s) that apply pressure to a backside of the workpiece 12, etc.

Referring to FIG. 2, the end-effector attachment assembly 38 may include a vacuum assembly 44 in fluid communication with the holders 40. More specifically, the vacuum assembly 44 may include a pump 46 and a plurality of conduits 48 connected to the pump 46. The conduits 48 are also connected to respective holders 40 such that the pump 46 is in fluid communication with the holders 40.

The vacuum assembly 44 may be activated and deactivated by the controller 36, which correspondingly controls whether the holders 40 secure the end-effector tool 16 to the workpiece 12. Therefore, the controller 36 is configured to activate the vacuum assembly 44 when the holders 40 engage the workpiece 12 to create suction between the holders 40 and the workpiece 12 to vacuum attach the end-effector tool 16 to the workpiece 12 at the predetermined location. That is, when it is desirable to attach the end-effector tool 16 to the workpiece 12, the pump 46 of the vacuum assembly 44 may be activated to remove fluid in the space between the holders 40 and the workpiece 12 to create a lower pressure between the holders 40 and the workpiece 12 (as compared to outside of the holders 40 at atmospheric pressure) to suction the holders 40 to the workpiece 12 and attach the end-effector tool 16 to the workpiece 12. To detach the end-effector tool 16 from the workpiece 12, the pump 46 may be deactivated to allow fluid to fill the space between the holders 40 and the workpiece 12, or the pump 46 may be activated to feed fluid into the space between the holders 40 and the workpiece 12, such that the pressure increases between the holders 40 and the workpiece 12 and the suction is removed to allow the holders 40 to detach from the workpiece 12.

The controller 36 may be configured to activate, deactivate, and/or modulate the vacuum assembly 44 of any of the holders 40 as desired. Furthermore, the controller 36 may be configured to increase or decrease a vacuum pressure to adjust or change a holding force between the respective holders 40 and the workpiece 12. The controller 36 may control the vacuum assembly 44 such that each of the holders 40 may be activated in any suitable arrangement. For example, the holders 40 may be activated individually one at a time, activated in a pattern, each activated simultaneously, or activated in any combination, groupings, etc. The controller 36 may be programmed to control engagement of the holders 40 relative to the workpiece 12. As such, the controller 36 may optimize actuation strategies to manage air consumption and control energy absorption and/or control dampening of vibrations.

Directional flow control valves and pressure regulators may be implemented to control the holders 40, and/or control the sequence that the holders 40 engage the workpiece 12. Therefore, the controller 36 may be in communication with the control valves and the pressure regulators.

As mentioned above, the controller 36 may control the process tools 24, i.e., the first process tools 24, the second process tools 24, etc., as desired. For example, one or more of the process tools 24 may be operated in a sequence, operated in a pattern, operated in a particular order, operated simultaneously, operated randomly, etc. Generally, a portion of each of the first process tools 24 is movable relative to the fixture 22, and may be movable through the fixture platform 26, when the task is performed to the work surface 14. That is, the controller 36 may activate the respective process tools 24, which may cause the portion of the process tools 24 to move toward or away from the work surface 14. Movement and operation of the process tools 24, and corresponding features, may be controlled mechanically, pneumatically, hydraulically, electrically, or any other suitable mechanism, and combinations thereof.

In certain configurations, the controller 36 is configured to control operation of each of the process tools 24, such as the first process tools 24, the second process tools 24, etc., simultaneously. Therefore, for example, once the fixture 22 is located relative to the workpiece 12, the controller 36 may activate each of the process tools 24 simultaneously. As such, for example, if each of the process tools 24 are configured to drill a hole 50, activation of the process tools 24, via the controller 36, may simultaneously drill the predetermined pattern in the workpiece 12 at that predetermined location. As another example, continuing with the drill example, the process tools 24 may be activated in a pattern, such as one at a time or in groups, etc.

As mentioned above, various process tools 24 may be attached to the fixture 22, and more specifically to the fixture platform 26. Furthermore, the process tools 24 may perform various manufacturing processes. As non-limiting examples, the process tools 24 may drill holes 50 and/or countersinks 52, may perform measurements, may apply sealant, coatings, etc., may insert fasteners 54 into the workpiece 12, etc., some of which are discussed below. Various details of these non-limiting examples of the process tools 24 are discussed next.

Optionally, the process tools may be configured to drill the holes 50, and if desired the holes 50 may include the countersink 52, a counterbore, a spotface, etc., in the workpiece 12. Therefore, in certain configurations of the process tools, the process tools may be a drill assembly. Referring to FIG. 1, some of the holes 50 have already been drilled into the workpiece 12 via the drill assemblies of one of the end-effector tools.

Optionally, the process tools may be configured to measure characteristics of the workpiece 12. Therefore, in certain configurations of the process tools, the process tools may be a measuring device. The measuring device may be various configurations, and non-limiting examples may include one or more of a camera assembly, a vision assembly, a distance sensor, a probe assembly, a linear scale, an optical distance sensor, an ultrasonic distance sensor, a magnetic strip, etc., and combinations thereof, to measure various characteristics of the workpiece 12. For example, the measuring device of the process tools may be configured to measure the size of the respective holes 50, depth of the respective holes 50, surface quality of the respective holes 50, surface quality of the work surface 14 and/or the workpiece 12, quality of the material of the workpiece 12, etc.

After the holes 50 have been drilled by the drill assembly and any of the desired measurements taken via the measuring device, fasteners 54 may be inserted into each of the holes 50. The discussion below will focus on the process tools 24 that insert the fasteners 54 into each of the holes 50. It is to be appreciated that the end-effector tool 16 may have multiple different types of process tools 24 attached thereto or one type of process tools 24 attached thereto. Therefore, for example, one end-effector tool 16 may have two or more types of process tools 24, e.g., a plurality of the drill assemblies and/or a plurality of the probe assemblies and/or a plurality of fastener installation assemblies 56, etc., and each of the different types of process tools 24 are operated in a predetermined order. Alternatively, for example, one end-effector tool 16 may only have the fastener installation assemblies 56, or may only have the drill assemblies, or may only have the probe assemblies, etc. The below discussion focuses on the end-effector tool 16 having the fastener installation assemblies 56 attached thereto.

Referring to FIGS. 1-4, the end-effector tool 16 includes a plurality of fastener installation assemblies 56 attached to the fixture 22. Therefore, FIGS. 1-4 illustrate the end-effector tool 16 for installing a plurality of the fasteners 54 into the respective holes 50 of the workpiece 12. More specifically, the fastener installation assembly 56 is utilized for installing the fasteners 54 into the respective holes 50 of the workpiece 12. Therefore, each of the fastener installation assemblies 56, which are attached to the fixtures 22, are utilized for installing the respective fasteners 54 into the respective holes 50 of the workpiece 12. Generally, the fastener installation assemblies 56 are operated after forming the holes 50 via the drill assemblies. Optionally, the measuring devices, such as the probe assemblies, may be operated after forming the holes 50 and before operating the fastener installation assemblies 56. The below discussion focuses on one fastener installation assembly 56, but it is to be appreciated that each of the fastener installation assemblies 56 may be configured the same, and therefore, the below discussion applies to any number of fastener installation assemblies 56 even though one fastener installation assembly 56 is mainly discussed.

Turning to FIGS. 5-8, the fastener installation assembly 56 includes a container 58 and a plurality of retainer assemblies 60 supported by the container 58. The container 58 may be any suitable configuration, and one non-limiting example is a track, a circular configuration in which the container 58 may rotate about a central axis 62 to correspondingly rotate the retainer assemblies 60, a rectangular or elongated configuration in which the container 58 moves linearly to correspondingly move the retainer assemblies 60 linearly, or any other suitable configuration.

Figure 8:
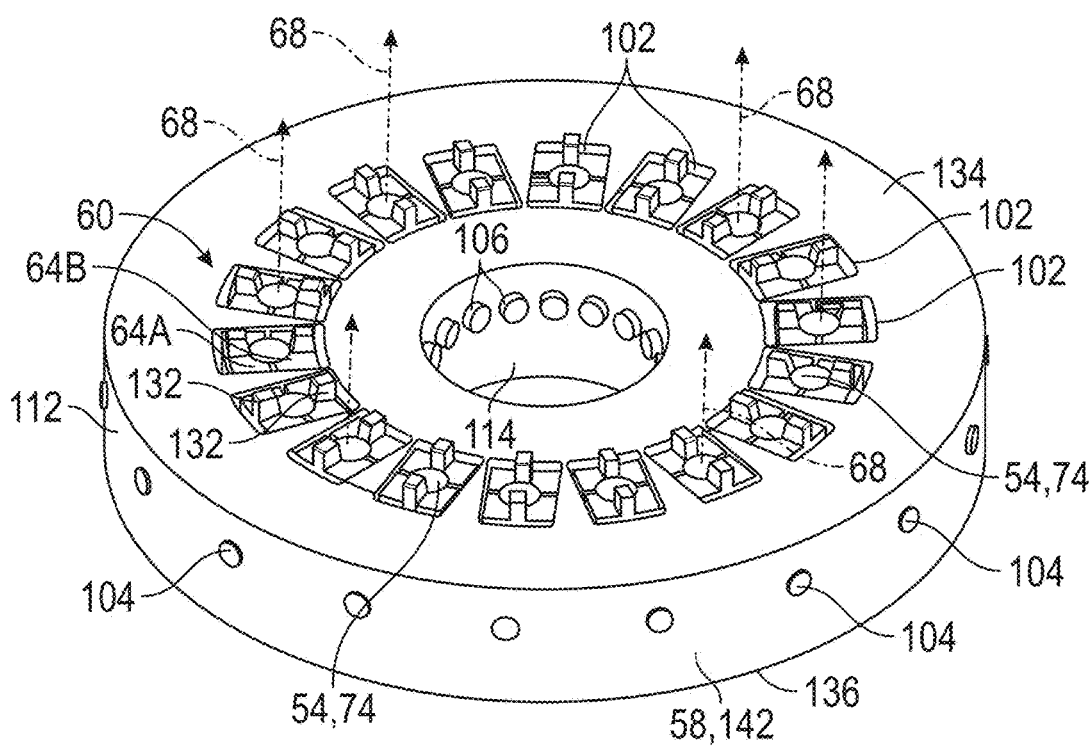
FIG. 8 is a schematic perspective view of a top side of the process tool of FIG. 6 with a cap of a container of the process tool also removed.

The arrangement of the retainer assemblies 60 may be different depending on the configuration of the container 58. When the container 58 is generally circular, the container 58 may be referred to as a drum, and the retainer assemblies 60 may be spaced from each other radially relative to the central axis 62 in a circular orientation, as best shown in FIG. 8.

Figure 9:
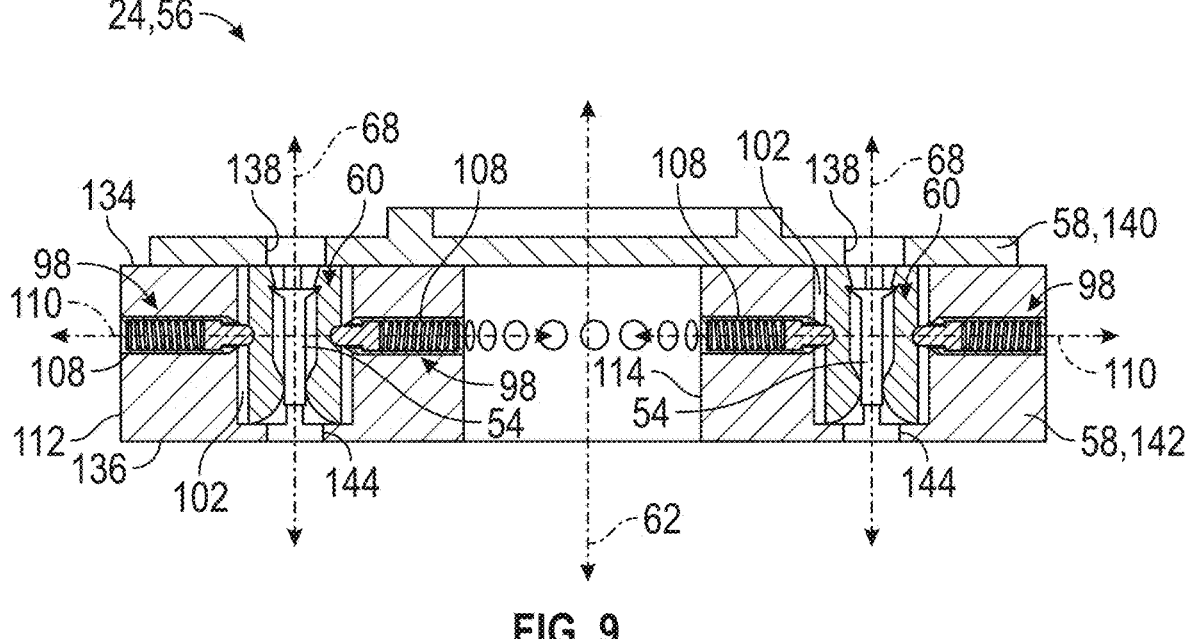
FIG. 9 is a schematic cross-sectional view of the process tool of FIG. 6 with a first actuator and a second actuator removed.
Figure 10:
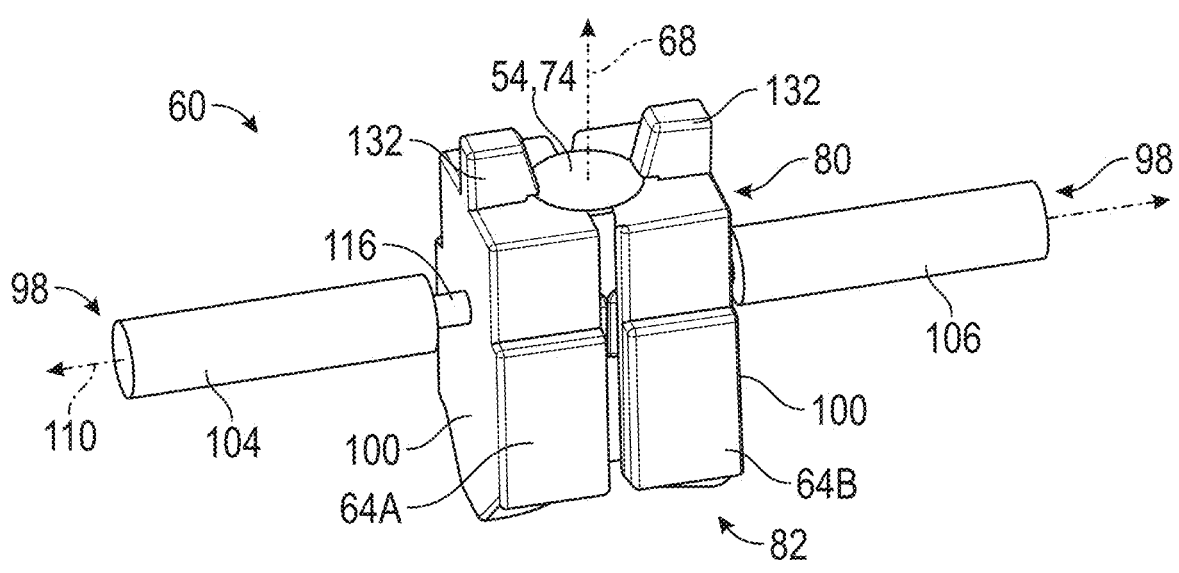
FIG. 10 is a schematic perspective view of one retainer assembly and one compliance apparatus of the process tool of FIG. 8.

Generally, the retainer assemblies 60 are utilized to retain a respective one of the fastener 54 for the fastener 54 installation process. Referring to FIGS. 9 and 10, each of the retainer assemblies 60 include a plurality of fingers 64A, 64B configured to retain a respective one of the fasteners 54 between the fingers 64A, 64B in a pre-installed position. That is, the retainer assemblies 60 orientate the respective fasteners 54 in a certain direction to install the fasteners 54 in the holes 50 in the desired orientation. FIGS. 7-11 illustrate the fasteners 54 in the pre-installed position.

In certain configurations, the plurality of fingers 64A, 64B of each of the retainer assemblies 60 are further defined as a first finger 64A and a second finger 64B disposed adjacent to each other. Generally, the first finger 64A and the second finger 64B of each of the retainer assemblies 60 are disposed adjacent to each other to define an opening 66 therebetween. Generally, the opening 66 of each of the retainer assemblies 60 provides a space for the respective fasteners 54 to be housed therein. Therefore, the opening 66 of each of the retainer assemblies 60 is configured to receive the respective one of the fasteners 54 in the pre-installed position.

Figure 11:
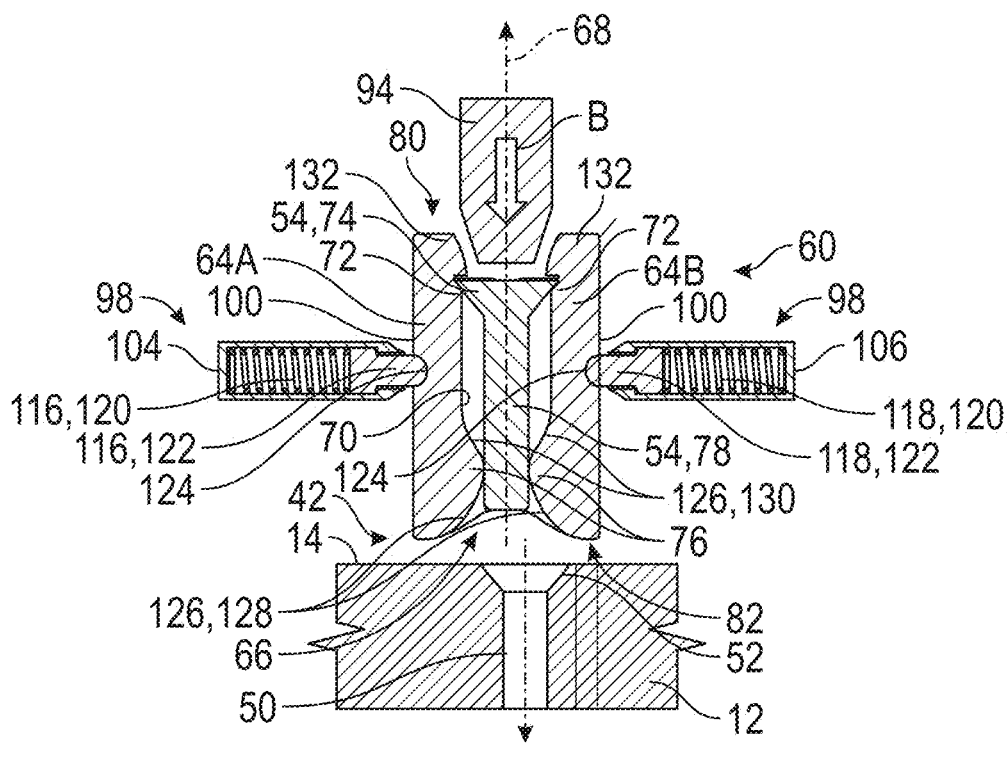
FIG. 11 is a schematic cross-sectional view of the retainer assembly of FIG. 10, with the retainer assembly retaining a fastener in a pre-installed position, in which the fastener is offset from a hole of a workpiece.

Referring to FIGS. 9 and 11, the opening 66 of each of the retainer assemblies 60 may extend along a longitudinal axis 68 and the longitudinal axis 68 is spaced apart from the central axis 62. The first finger 64A and the second finger 64B of each of the retainer assemblies 60 may include an inward surface 70 facing each other to define the opening 66 therebetween. The inward surface 70 of the first finger 64A and the inward surface 70 of the second finger 64B of each of the retainer assemblies 60 may include a lip 72 extending into the respective opening 66. The lip 72 of the first finger 64A and the second finger 64B of each of the retainer assemblies 60 cooperate to retain the respective one of the fasteners 54 in the pre-installed position. That is, part of the respective fasteners 54, such as a head 74 of the fasteners 54, engage and/or rest on the lip 72 of the respective retainer assemblies 60 when the respective fasteners 54 are in the pre-installed position.

Optionally, the inward surface 70 of the first finger 64A and the inward surface 70 of the second finger 64B of each of the retainer assemblies 60 may include a protrusion 76 extending into the respective opening 66 and spaced from the respective lip 72. The protrusion 76 of each of the retainer assemblies 60 may assist in stabilizing the respective fastener 54 inside of the opening 66 in the pre-installed position. Therefore, as best shown in FIG. 11, the protrusion 76 of each of the retainer assemblies 60 may engage part of the respective fasteners 54, such as a shank 78 of the fasteners 54, when in the pre-installed position.

Referring to FIGS. 9 and 11, the first finger 64A and the second finger 64B of each of the retainer assemblies 60 may include a first end 80 and a second end 82 spaced from each other along the longitudinal axis 68. In certain configurations, the opening 66 is disposed along the longitudinal axis 68, and the opening 66 extends from the first end 80 to the second end 82. Generally, the second end 82 of the first finger 64A and the second end 82 of the second finger 64B of each of the retainer assemblies 60 are disposed closer to the workpiece 12 than the first end 80 of the first finger 64A and the first end 80 of the second finger 64B of each of the retainer assemblies 60.

In certain configurations, the lip 72 of each of the retainer assemblies 60 is disposed closer to the first end 80 of the respective first finger 64A and the respective second finger 64B than to the second end 82 of the respective first finger 64A and the respective second finger 64B. As such, the head 74 of the respective fasteners 54 are disposed closer to the first end 80 of the respective first finger 64A and the respective second finger 64B than the second end 82 of the respective first finger 64A and the respective second finger 64B, such that the shank 78 of the respective fasteners 54 enter the respective holes 50 of the workpiece 12 before the head 74 of the respective fasteners 54 during assembly.

Turning back to FIGS. 5 and 6, the fastener installation assembly 56 also includes a first actuator 84 configured to move the respective fasteners 54 to an installed position by ejecting the respective one of the fasteners 54 out of the respective retainer assemblies 60 and inserting the respective one of the fasteners 54 into one of the holes 50 of the workpiece 12. The first actuator 84 may be any suitable actuator to cause movement of the fasteners 54 into the respective holes 50 of the workpiece 12, and non-limiting examples may include a motor, such as an electric motor, hydraulic motor, pneumatic motor, etc.

Figure 5:
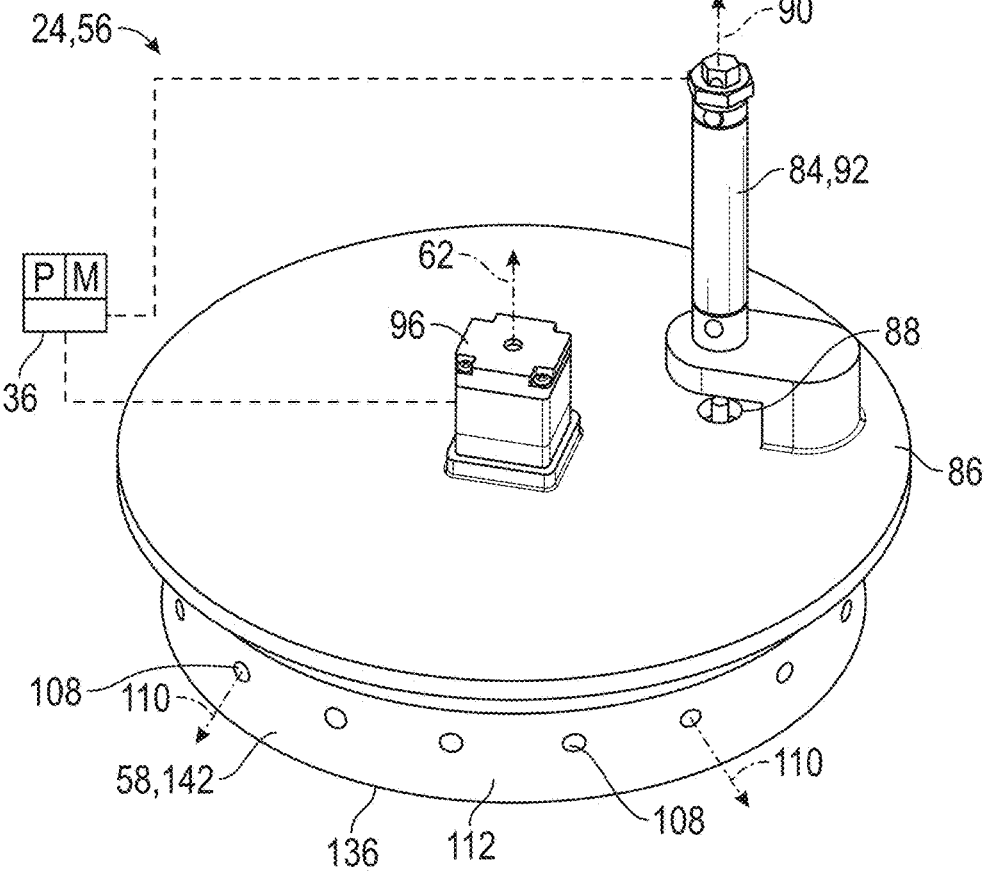
FIG. 5 is a schematic perspective view of one of the process tools, being a fastener installation assembly, removed from the fixture.

Continuing with FIG. 5, the fastener installation assembly 56 may also include a bracket 86 disposed proximal to the container 58. The first actuator 84 is also disposed proximal to the container 58 and the first actuator 84 is attached to the bracket 86. That is, the bracket 86 supports the first actuator 84.

Continuing with FIG. 5, the bracket 86 may define an access hole 88 disposed along a bracket axis 90, and the first actuator 84 may at least partially align with the bracket axis 90. The access hole 88 provides the first actuator 84 access to the fasteners 54 retained by the retainer assemblies 60 such that the first actuator 84 may eject the fastener 54 that is aligned with the access hole 88 to install the fastener 54 into the workpiece 12.

Figure 6:
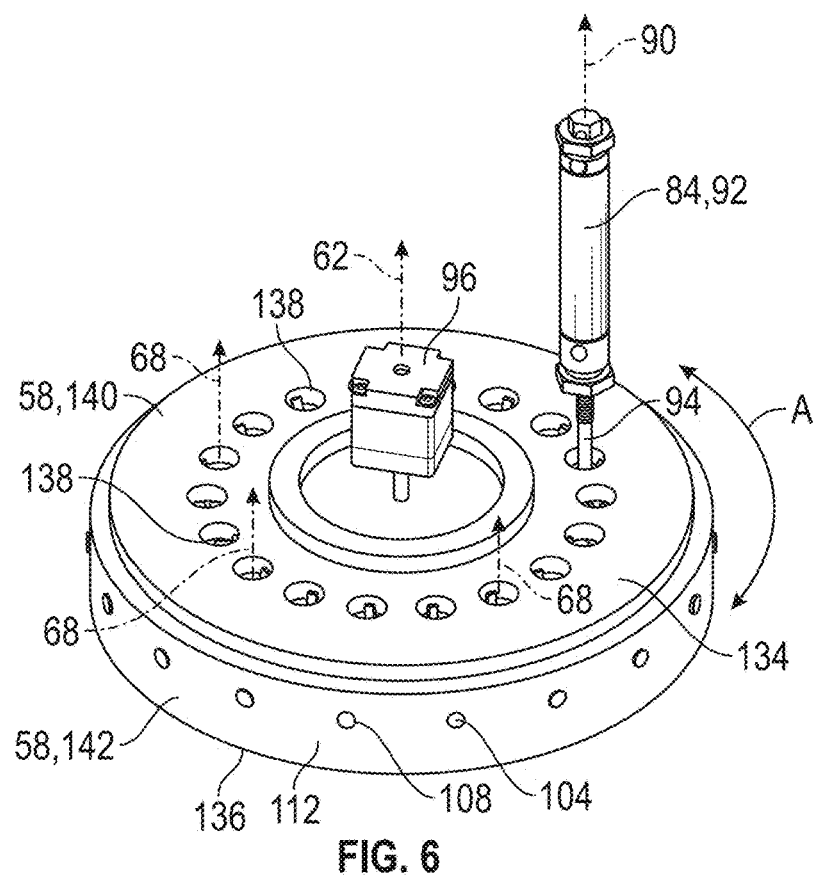
FIG. 6 is a schematic perspective view of a top side of the process tool of FIG. 5 with a bracket of the process tool removed.
Figure 7:
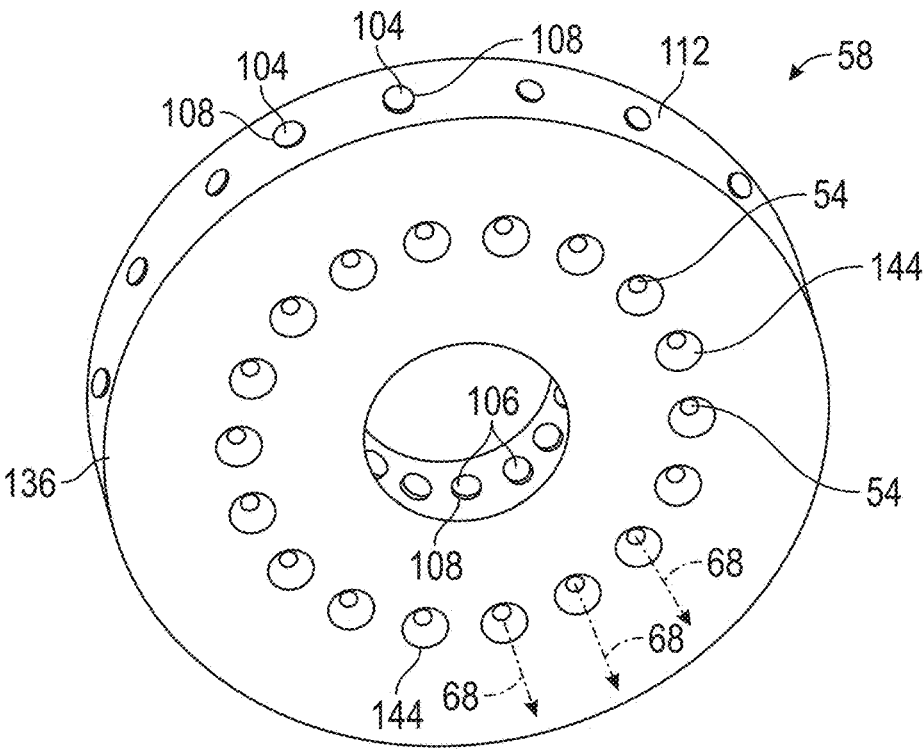
FIG. 7 is a schematic perspective view of a bottom side of the process tool of FIG. 6.

Turning to FIGS. 5 and 6, the first actuator 84 may include a housing 92 fixed to the bracket 86 and a rod 94 movable relative to the housing 92 from an initial position to an extended position to eject the respective one of the fasteners 54 from the respective retainer assemblies 60 to the installed position. Generally, the rod 94 is movable along the bracket axis 90, i.e., axially relative to the bracket axis 90, between the initial position and the extended position. Furthermore, the longitudinal axis 68 and the bracket axis 90 substantially align with each other for the fastener 54 ready to be inserted into the hole 50 of the workpiece 12. Therefore, when the first actuator 84 is operated to move the rod 94 into the extended position, the rod 94 extends through the access hole 88 of the bracket 86 and engages the fastener 54 to push the fastener 54 over the lip 72, out of the opening 66, and into the hole 50 of the workpiece 12.

Figure 12:
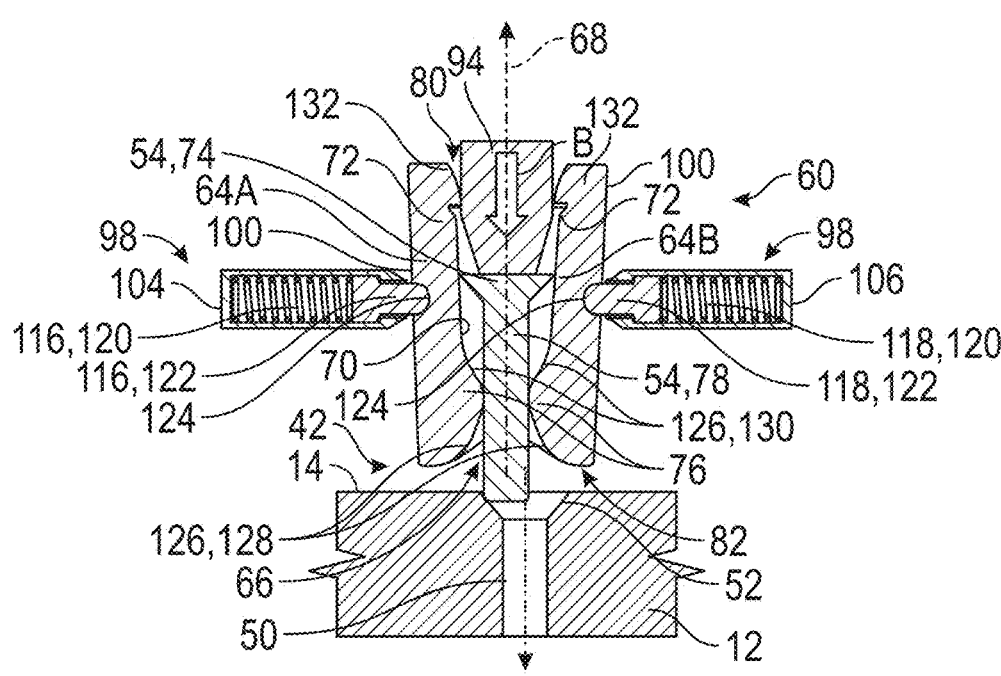
FIG. 12 is a schematic cross-sectional view of the retainer assembly of FIG. 11, in which the first actuator engages the fastener to move the fastener toward the hole of the workpiece.
Figure 13:
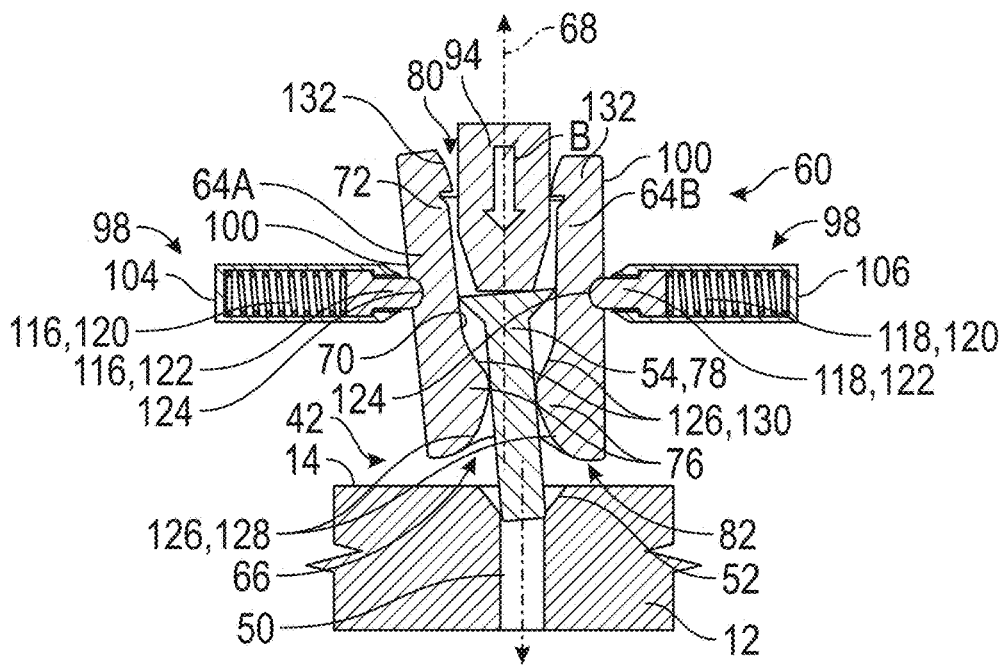
FIG. 13 is a schematic cross-sectional view of the retainer assembly of FIG. 11, in which the first actuator continues to move the fastener into the hole and the compliance apparatus allows the fastener to self-align with the hole of the workpiece as the fastener enters the hole.
Figure 14:
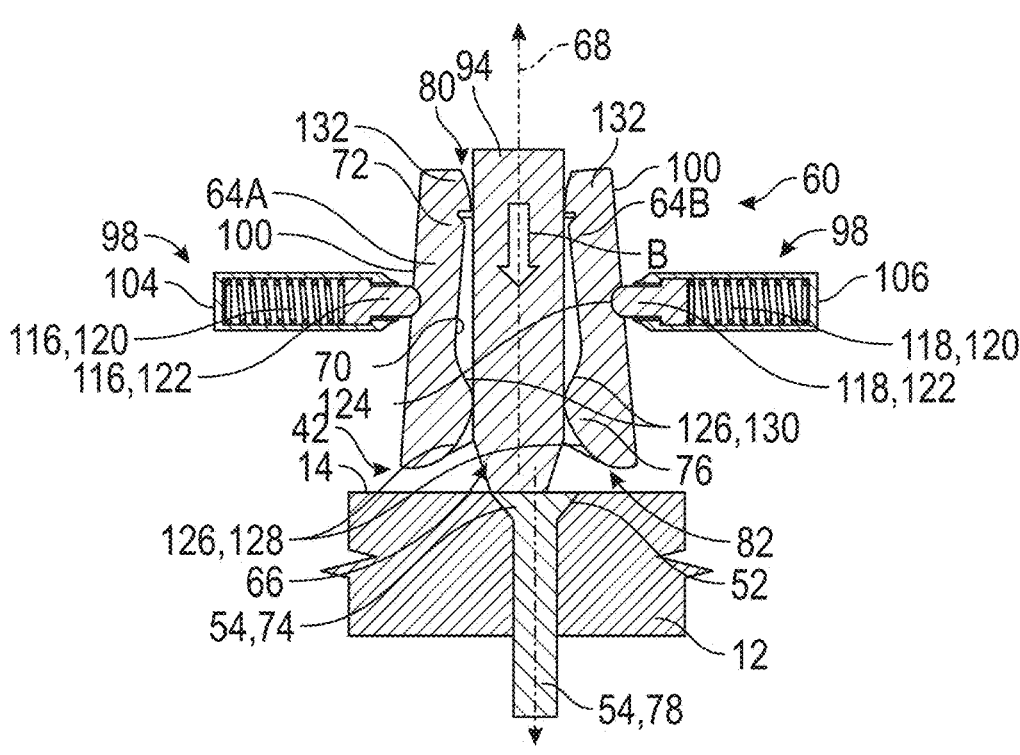
FIG. 14 is a schematic cross-sectional view of the retainer assembly of FIG. 11, in which the first actuator continues to move the fastener into the hole until the fastener is fully seated in the hole of the workpiece in an installed position.
Figure 15:
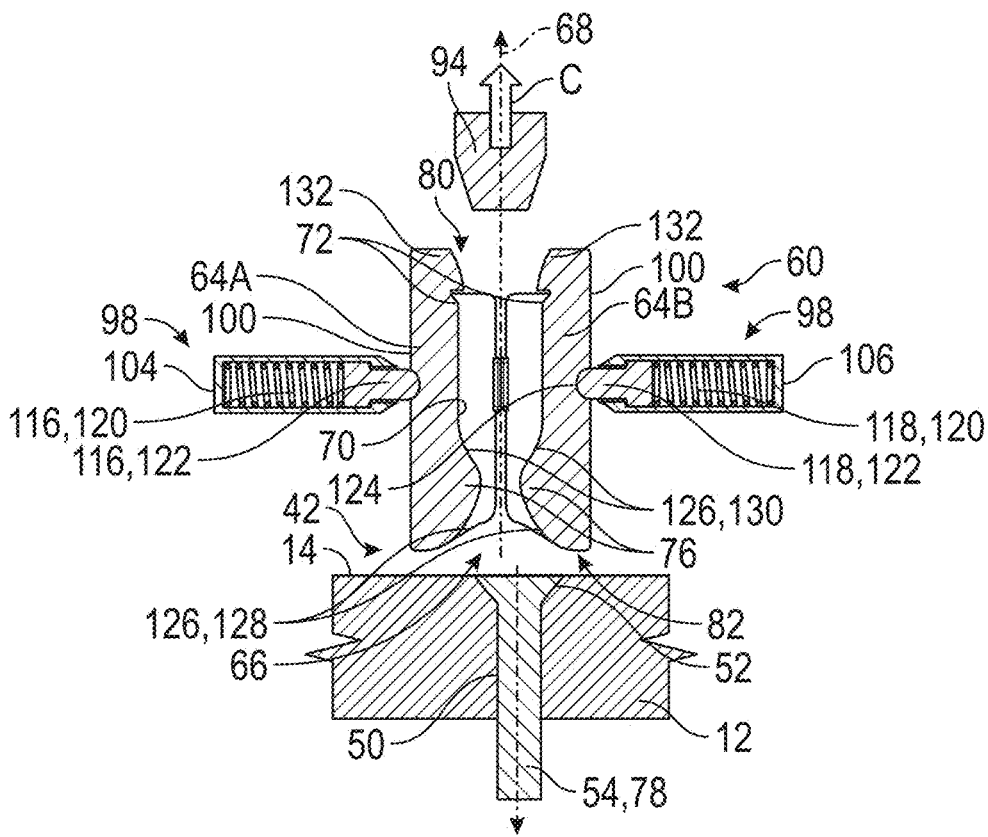
FIG. 15 is a schematic cross-sectional view of the retainer assembly of FIG. 11, in which the first actuator is retracted out of the retainer assembly.

FIGS. 11-14 illustrate operation of the rod 94 when inserting the fastener 54 into the hole 50 of the workpiece 12. In FIG. 11, the rod 94 is shown moving in direction of arrow B toward the extended position. In FIGS. 12 and 13, the rod 94 continues to move in the direction of arrow B toward the extended position, in which the rod 94 moves through the opening 66 between the respective first finger 64A and the respective second finger 64B and begins to insert the fastener 54 into the hole 50 of the workpiece 12. In FIG. 14, the rod 94 reaches the extended position, in which the fastener 54 is fully seated in the hole 50 of the workpiece 12. Referring to FIG. 15, once the fastener 54 is fully seated in the hole 50, the rod 94 moves in the direction of arrow C from the extended position back to the initial position.

Once the first actuator 84 operates to eject one of the respective fasteners 54 to the installed position, the bracket 86 or the container 58 is movable to cycle to another one of the retainer assemblies 60 that is holding another one of the fasteners 54 in the pre-installed position so the installation process may occur at another one of the holes 50. Depending on which one (of the bracket 86 or the container 58) is movable, the other one of the bracket 86 or the container 58 is stationary. Therefore, for example, if the bracket 86 is movable then the container 58 is stationary, and thus, the bracket 86 cycles the first actuator 84 to align with another one of the retainer assemblies 60. As another example, if the container 58 is movable then the bracket 86 is stationary, and thus, the container 58 cycles the retainer assemblies 60 to align another one of the retainer assemblies 60 with the first actuator 84.

As such, the bracket 86 or the container 58 is movable to an actuated position, and the other one of the bracket 86 or the container 58 is in a fixed position. For example, in certain configurations, the container 58 is movable to the actuated position and the bracket 86 is disposed in the fixed position such that the container 58 is movable relative to the bracket 86 to the actuated position.

To move the bracket 86 or the container 58, the fastener installation assembly 56 may further include a second actuator 96. The second actuator 96 is coupled to the bracket 86 and/or the container 58, depending on which is movable. In one non-limiting example, the second actuator 96 is attached to the bracket 86 and operatively coupled to the container 58. Therefore, the second actuator 96 may be configured to move the container 58 to the actuated position to cycle the respective one of the fasteners 54 of each of the retainer assemblies 60 to align with the first actuator 84. FIG. 6 illustrates arrow A to indicate possible directional movement, i.e., rotation in this example, of the container 58 relative to the first actuator 84. The second actuator 96 may be any suitable actuator to cause movement of the container 58 or the bracket 86 to align the next fastener 54 with the first actuator 84, and non-limiting examples may include a motor, such as an electric motor, hydraulic motor, pneumatic motor, etc.

In some instances, the end-effector tool 16 aligns with the workpiece 12 such that respective fasteners 54 are slightly off-center from the respective holes 50 of the workpiece 12. As such, sometimes alignment of one or more of the process tools 24 needs slight adjustment. Therefore, referring to FIGS. 9-14, the process tools 24, such as each of the fastener installation assemblies 56, may include a compliance apparatus 98 which allows compliance of one or more of the fasteners 54 relative to the workpiece 12 to accommodate one or more workpiece 12 tolerances as the respective fasteners 54 is inserted into the respective holes 50 of the workpiece 12. Generally, the compliance apparatus 98 of each of the process tools 24 provides a passive compliance feature. The compliance apparatus 98 may assist in improving alignment of the fasteners 54 and/or assist in reducing jamming of the fasteners 54 during insertion into the holes 50 of the workpiece 12.

Therefore, each of the retainer assemblies 60 may also include the compliance apparatus 98 configured to allow the respective one of the fasteners 54 and the respective fingers 64A, 64B to move independently of each other to self-align the respective one of the fasteners 54 with the respective one of the holes 50 as the first actuator 84 moves the respective one of the fasteners 54 from the pre-installed position to the installed position.

Referring to FIG. 9, the first finger 64A and the second finger 64B of each of the retainer assemblies 60 may include an outward surface 100 that faces away from the respective opening 66. Generally, the compliance apparatus 98 is coupled to the outward surface 100 to suspend the respective first finger 64A and the respective second finger 64B inside of the container 58. More specifically, the container 58 defines a plurality of pockets 102 spaced apart from each other, and the respective retainer assemblies 60 are suspended inside of the respective pockets 102 via the respective compliance apparatus 98. That is, the first finger 64A and the second finger 64B of each of the retainer assemblies 60 are suspended inside of the respective pockets 102. Generally, the respective pockets 102 are disposed along the respective longitudinal axis 68.

That is, the compliance apparatus 98 is coupled to the outward surface 100 to allow the first finger 64A and the second finger 64B of each of the retainer assemblies 60 to move independently of each other when the respective one of the fasteners 54 moves between the pre-installed position and the installed position. Referring to FIGS. 12-14, these figures illustrate an example of the independent movement of the first finger 64A and the second finger 64B when the fastener 54 is slightly offset or misaligned relative to the hole 50 of the workpiece 12. The respective pockets 102 are larger than the respective retainer assembly 60 to allow independent movement of the respective first finger 64A and the respective second finger 64B without interference from the container 58.

As mentioned above, the respective compliance apparatus 98 suspends the respective retainer assembly 60. Therefore, as best shown in FIG. 9, the compliance apparatus 98 of each of the retainer assemblies 60 may include a first arm 104 supporting the respective first finger 64A and a second arm 106 supporting the respective second finger 64B. The respective first finger 64A is rotatable relative to the respective first arm 104 and the respective second finger 64B is rotatable relative to the respective second arm 106 to allow the respective one of the fasteners 54 to self-align with the respective one of the holes 50 as the respective one of the fasteners 54 moves from the pre-installed position to the installed position.

Furthermore, the container 58 may define a plurality of channels 108 extending along an arm axis 110 transverse to the longitudinal axis 68 and/or the central axis 62. The respective first arm 104 of the respective first finger 64A is disposed in one of the respective channels 108 and the respective second arm 106 of the respective second finger 64B is disposed in another one of the respective channels 108. As such, the container 58 supports the respective first arm 104 and the respective second arm 106 of the respective compliance apparatus 98.

Continuing with FIG. 9, the container 58 may include a first wall 112 and a second wall 114 spaced from each other, and spaced radially relative to the central axis 62. The first wall 112 and the second wall 114 may each surround the central axis 62. Furthermore, the second wall 114 may be disposed between the first wall 112 and the central axis 62. In addition, each of the retainer assemblies 60 are disposed between the first wall 112 and the second wall 114.

Referring to FIGS. 8 and 9, generally, the first arm 104 of each of the retainer assemblies 60 is attached to the first wall 112 and the second arm 106 of each of the retainer assemblies 60 is attached to the second wall 114. More specifically, the respective channels 108 of the container 58 intersect the first wall 112 and the second wall 114 (see FIGS. 8 and 9), as well as intersect the respective pockets 102 (see FIG. 9).

The compliance apparatus 98 of each of the retainer assemblies 60 may also include a first biasing plunger 116 coupled to the respective first arm 104 and a second biasing plunger 118 coupled to the respective second arm 106. The respective first biasing plunger 116 is movable linearly (along the arm axis 110) relative to the respective first arm 104 and the respective second biasing plunger 118 is movable linearly (along the arm axis 110) relative to the respective second arm 106 to allow compliance of the respective first finger 64A and the respective second finger 64B to allow the respective one of the fasteners 54 to self-align relative to the respective one of the holes 50 during movement from the pre-installed position to the installed position. The first biasing plunger 116 and the second biasing plunger 118 may each include one or more of a biaser 120, a biasing member, a spring, or any other suitable resilient component to allow biasing of the respective first biasing plunger 116 and the respective second biasing plunger 118. The first biasing plunger 116 and the second biasing plunger 118 may each include a plunger 122 in which the biaser 120 reacts against to continuously bias the respective plunger 122 toward the respective first finger 64A and the respective second finger 64B.

Optionally, the outward surface 100 of the respective first finger 64A and the respective second finger 64B defines a seat 124 to receive a tip of the first biasing plunger 116 and a tip of the second biasing plunger 118, respectively. The seat 124 of the respective first finger 64A and the respective second finger 64B may assist in allowing the respective first finger 64A and the respective second finger 64B to pivot about the respective first biasing plunger 116 and the respective second biasing plunger 118.

After the respective fasteners 54 have been ejected out of the respective retainer assemblies 60, it is desirable to reload the container 58 with more fasteners 54. As such, the features to reload the container 58 are discussed.

Figure 16:
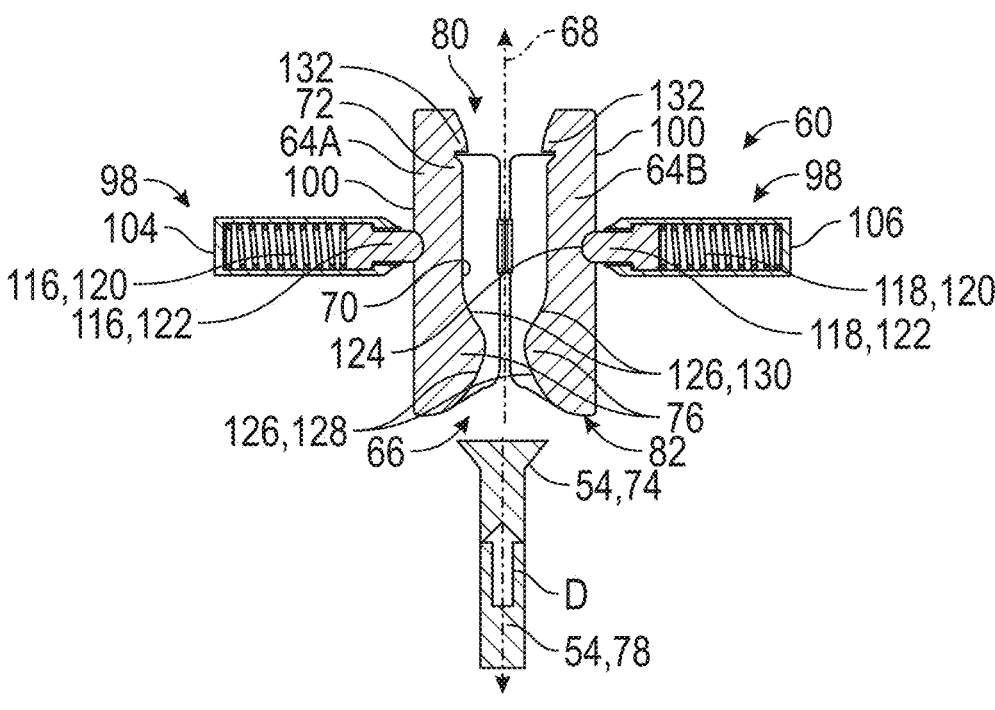
FIG. 16 is a schematic cross-sectional view of the retainer assembly of FIG. 15, in which another fastener is being installed into the retainer assembly.
Figure 17:
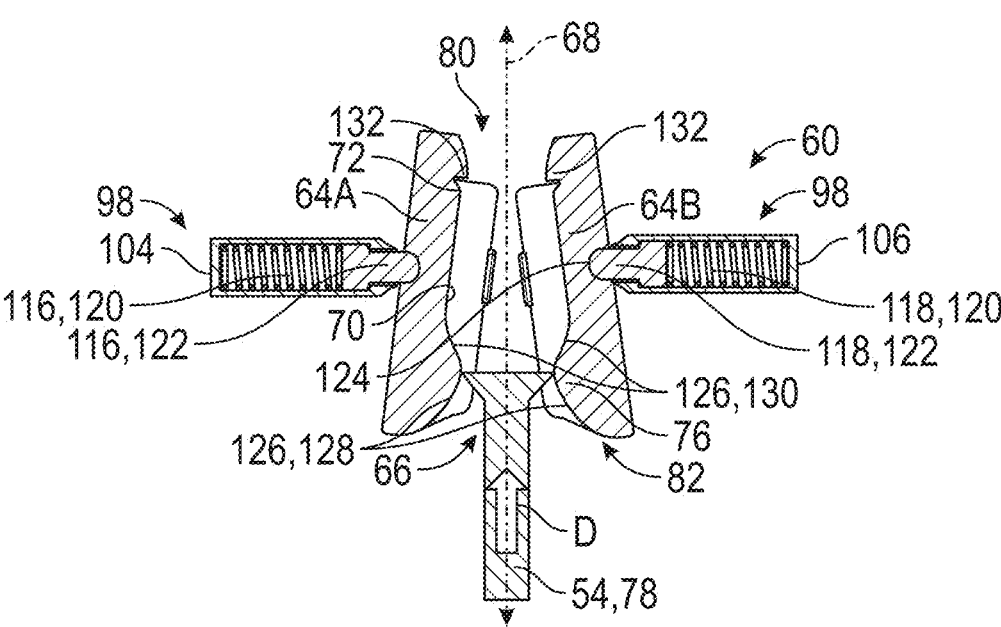
FIG. 17 is a schematic cross-sectional view of the retainer assembly of FIG. 16, in which the fastener of FIG. 16 continues to move into the retainer assembly.
Figure 18:
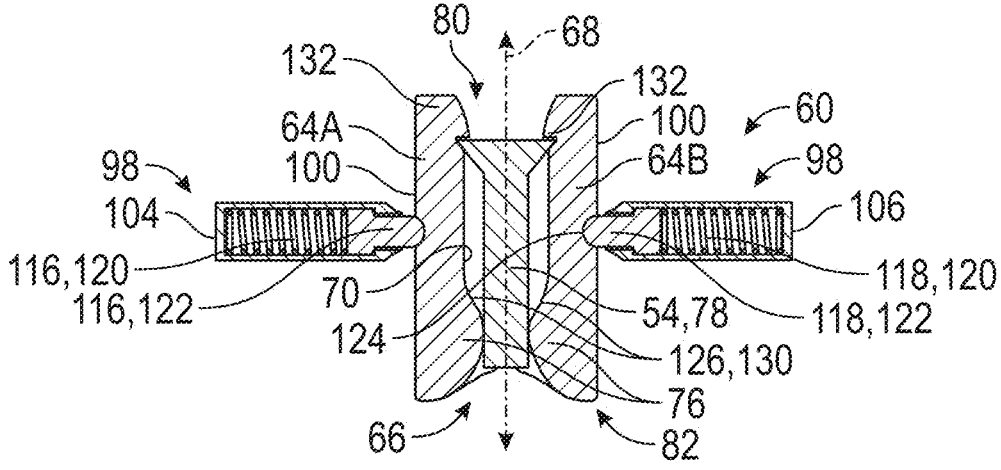
FIG. 18 is a schematic cross-sectional view of the retainer assembly of FIG. 16, in which the fastener of FIG. 17 is retained in the retainer assembly in the pre-installed position.

Referring to FIGS. 16-18, the fastener 54 enters the opening 66 of the retainer assembly 60 from the second end 82 of the retainer assembly 60 in the direction of arrow D. The inward surface 70 of the first finger 64A and the second finger 64B of each of the retainer assemblies 60 may include a guide 126 extending into the opening 66. The guide 126 is configured to guide the fastener 54 into the opening 66 as well as open the first finger 64A and the second finger 64B of each of the retainer assemblies 60 to receive the respective one of the fasteners 54 as the respective one of the fasteners 54 is inserted into the respective opening 66 from a first direction (see arrow D) to dispose the respective one of the fasteners 54 in the pre-installed position.

In certain configurations, the guide 126 of each of the retainer assemblies 60 is disposed closer to the second end 82 of the respective first finger 64A and the respective second finger 64B than to the first end 80 of the respective first finger 64A and the respective second finger 64B. In certain configurations, the guide 126 is disposed at the second end 82 of the respective first finger 64A and the respective second finger 64B. The guide 126 may include a first taper 128 extending toward the longitudinal axis 68 as the guide 126 extends away from the second end 82 to assist in opening 66 the retainer assembly 60 as the head 74 of the next fastener 54 is fed into the opening 66 (see FIG. 17), and include a second taper 130 extending away from the longitudinal axis 68 as the fastener 54 continues toward the first end 80 which allows the retainer assembly 60 to close after the head 74 passes the guide 126 (see FIG. 18).

In addition, the first finger 64A and/or the second finger 64B of each of the retainer assemblies 60 may include a stop 132 that limits movement of the respective one of the fasteners 54 in the first direction (see arrow D). In certain configurations, both the first finger 64A and the second finger 64B of each of the retainer assemblies 60 include the stop 132. Generally, the stop 132 is disposed closer to the first end 80 than the second end 82. In certain configurations, the stop 132 is disposed at the first end 80 of the first finger 64A and at the first end 80 of the second finger 64B to partially close the opening 66 at the first end 80. Therefore, the head 74 of the fastener 54 may engage the stop 132 to prevent farther movement of the fastener 54, and thus, position the head 74 of the fastener 54 between the lip 72 and the stop 132 which ensure that the fastener 54 is disposed in the pre-installed position within the retainer assembly 60.

Referring to FIGS. 8 and 9, to dispose the retainer assemblies 60 inside of the container 58, the container 58 may include a top side 134 and a bottom side 136 spaced from each other relative to the central axis 62. The first wall 112 and the second wall 114 are disposed between the top side 134 and the bottom side 136. The pockets 102 may be defined through one of the top side 134 or the bottom side 136 to allow access for the retainer assemblies 60. In certain configurations, the pockets 102 are defined through the top side 134 and are spaced from the second side such that the retainer assemblies 60 may be assembled and disassembled from the container 58 from one side.

The container 58 may define a plurality of access apertures 138 spaced from each other. Optionally, the container 58 may include a cap 140 that defines the access apertures 138 and a main body 142 that defines the pockets 102 and supports the retainer assemblies 60. As such, the cap 140 may close the pockets 102 relative to the top side 134 of the main body 142. Each of the access apertures 138 may align with the respective opening 66 of the retainer assemblies 60. That is, the access apertures 138 may be disposed along the longitudinal axis 68. The access apertures 138 are sized to allow the rod 94 of the first actuator 84 to extend therethrough. In certain configurations, the access apertures 138 have an outer diameter that is smaller than an outer diameter of the pockets 102.

In addition, the container 58 may define a plurality of egress apertures 144 that align with the respective access apertures 138 of the container 58. That is, the egress apertures 144 may be disposed along the longitudinal axis 68. The egress apertures 144 may be defined through the bottom side 136 of the main body 142. The egress apertures 144 are sized to allow the fastener 54 to extend therethrough. In certain configurations, the egress apertures 144 have an outer diameter that is smaller than the outer diameter of the pockets 102. The rod 94 aligns with one of the access apertures 138 such that the rod 94 is movable through the access aperture 138 and into the respective opening 66 to eject the respective one of the fasteners 54 from the respective retainer assemblies 60 and through the egress aperture 144, to insert the respective one of the fasteners 54 in the respective one of the holes 50 of the workpiece 12 in the installed position.

The present disclosure also includes a method of installing the plurality of fasteners 54 into the respective holes 50 of the workpiece 12. As shown in FIG. 1, the workpiece 12 is provided. As discussed above, the workpiece 12 may be any suitable configuration, and FIG. 1 is for illustrative purposes. Depending on the desired component 12 and/or the desired manufacturing process, the corresponding end-effector tool 16 is selected. In this example, the end-effector tool 16 having at least the fastener installation assemblies 56 will be selected.

The end-effector tool 16 is selected to perform the task to the work surface 14. Then the machine 18 is attached to the selected end-effector tool 16 to control the end-effector tool 16. One of the fasteners 54 is installed in each of the retainer assemblies 60 of the container 58 of the fastener installation assembly 56 in the pre-installed position. As discussed above, each of the retainer assemblies 60 include the fingers 64A, 64B configured to retain a respective one of the fasteners 54 between the fingers 64A, 64B in the pre-installed position. Therefore, prior to aligning the end-effector tool 16 relative to the workpiece 12 to perform a process to the workpiece 12, each of the retainer assemblies 60 of each of the containers 58 are loaded with the fasteners 54 such that the fasteners 54 are contained within the containers 58 in the pre-installed position.

Next, the controller 36 controls the machine 18 to position the end-effector tool 16 relative to the workpiece 12. When the end-effector tool 16 is disposed in the desired location, the end-effector tool 16 is attached to the workpiece 12, via the holders 40. First, the controller 36 uses data from the positioning sensors 30 to locate the end-effector tool 16 in the desired position, orientation, i.e., desired location, relative to the work surface 14. Then, the controller 36 activates the vacuum assembly 44 such that the holders 40 secure the selected end-effector tool 16 to the predetermined location of the workpiece 12 so that the task may be performed. For example, the vacuum assembly 44 is activated, via the controller 36, to create suction between the holders 40 and the workpiece 12 to vacuum attach the end-effector tool 16 to the workpiece 12 at the predetermined location. Generally, the vacuum assembly 44 is activated before activating operation of the process tools 24.

The controller 36 is configured to control the end-effector tool 16, including controlling the process tools 24. Operation of the end-effector tool 16 is controlled, via the controller 36, such that the controller 36 positions the end-effector tool 16 relative to the workpiece 12 to align one of the fasteners 54 of the fastener installation assembly 56 with one of the holes 50. For example, movement of the end-effector tool 16 is controlled, via the controller 36, to position the process tools 24 relative to the work surface 14 such that the predetermined pattern is aligned at the predetermined location relative to the work surface 14. In this example, the controller 36 positions the fastener installation assemblies 56 relative to the respective holes 50.

In addition, operation of the process tools 24 is controlled, via the controller 36, such that the process tools 24 perform the task to the work surface 14 to form the first processed area 39 at the predetermined location of the work surface 14. Generally, operation of the process tools 24 occurs after aligning and securing the end-effector tool 16 relative to the work surface 14. In certain configurations, operation of the process tools 24 may include operating the first actuator 84 via the controller 36.

The controller 36 may control the process tools 24 as desired. In certain configurations, controlling operation of the first process tools 24 (or any of the other process tools 24 i.e., the second process tools 24, the third process tools 24, the fourth process tools 24, etc.) occurs simultaneously. In other words, all of the first process tools 24 may be operated at the same time. Optionally, the controlling operation of the first process tools 24 (or any of the other process tools 24, i.e., the second process tools 24, the third process tools 24, the fourth process tools 24, etc.) may occur one at a time, in a sequence or pattern, etc. The controller 36 may be programmed with the program/the data, etc., to control and operate the end-effector tool(s) 16 and corresponding process tools 24.

Once the fixture 22 is attached to the workpiece 12 via the holders 40, the fastener 54 installation process may proceed. One of the fasteners 54 is aligned relative to one of the holes 50 of the workpiece 12. That is, each of the fasteners 54 are aligned with the respective holes 50 of the workpiece 12 of the predetermined location for the fastener 54 installation process.

Next, operation of the process tools 24 may be activated, via the controller 36, to insert the fasteners 54 into the respective holes 50. That is, the first actuator 84 is operated to eject the respective one of the fasteners 54 out of the respective retainer assemblies 60. More specifically, the controller 36 activates the first actuator 84, which causes the rod 94 to move from the initial position to the extended position. The respective rod 94 engages the respective fastener 54 as the rod 94 moves to the extended position, and each of the fasteners 54 are ejected out of the opening 66 of the respective retainer assemblies 60 in the direction, i.e., a second direction, (see arrow B in FIGS. 11-14) to dispose the fasteners 54 in the installed position.

The controller 36 may activate each of the fastener installation assemblies 56 in any order, and for example, the first actuator 84 of each of the fastener installation assemblies 56 may be activated individually one at a time, activated in a pattern, each activated simultaneously, or activated in any combination, groupings, etc.

The respective one of the fasteners 54 is inserted into one of the holes 50 of the workpiece 12 to the installed position via the first actuator 84. As also discussed above, each of the retainer assemblies 60 include the compliance apparatus 98 configured to allow the respective one of the fasteners 54 and the respective fingers 64A, 64B to move independently of each other to self-align the respective one of the fasteners 54 with the respective one of the holes 50 as the first actuator 84 moves the respective one of the fasteners 54 from the pre-installed position to the installed position. In certain configurations, inserting the respective one of the fasteners 54 into one of the holes 50 further includes adjusting an orientation of the respective one of the fasteners 54 relative to the respective one of the holes 50, via the compliance apparatus 98, to self-align the respective one of the fasteners 54 during insertion into the respective one of the holes 50.

Optionally, two or more workpieces 12 may be stacked relative to each other such that holes 50 of the corresponding workpieces 12 align with each other, and the fastener installation assemblies 56 may be implemented to install the respective fasteners 54 through the respective holes 50 of the stacked workpieces 12.

Once the respective fasteners 54 are disposed in the installed position, the controller 36 activates the first actuators 84 to retract the respective rod 94 back to the initial position (see arrow C of FIG. 15). Once the rod 94 exits the container 58, the controller 36 may activate the second actuator 96 to cycle the container 58 to the next fastener 54 contained in the next retainer assembly 60 in order to align this fastener 54 with the first actuator 84 to repeat this process for another one of the holes 50 of the workpiece 12 at another area to be processed.

Once the fastener 54 installation process is completed at that location, and if the end-effector tool 16 only includes the fastener installation assemblies 56, then the controller 36 may deactivate the vacuum assembly 44 to remove suction so that the holders 40 release the end-effector tool 16 from the workpiece 12. Also, if the end-effector tool 16 only includes the fastener installation assemblies 56, the machine 18 may repeat the process for another location of the workpiece 12 or start this process over for another workpiece 12.

After a predetermined number of fastener 54 insertions, the containers 58 will need to be reloaded with more fasteners 54. Therefore, turning to FIGS. 16-18, reloading of one fastener 54 relative to one of the retainer assemblies 60 is illustrated, but it is to be appreciated that all of the retainer assemblies 60 may be reloaded the same as the illustration of FIGS. 16-18.

Referring to FIGS. 16 and 17, each of the fasteners 54 are installed into the opening 66 between the respective fingers 64A, 64B of the respective retainer assemblies 60 in the first direction (see arrow D of FIGS. 16 and 17) to retain the fasteners 54 in the pre-installed position. The respective fingers 64A, 64B open as the head 74 of the fastener 54 enters the retainer assembly 60 from the second end 82. In certain configurations, installing one of the fasteners 54 in each of the retainer assemblies 60 further includes inserting each of the fasteners 54 into the opening 66 between the respective fingers 64A, 64B of the respective retainer assemblies 60 until the respective fasteners 54 passes the lip 72 that retains the respective fasteners 54 inside of the respective opening 66. The fastener 54 may continue to move in the direction of arrow D until the head 74 of the fastener 54 engages the stop 132, which assists in ensuring that the head 74 of the fastener 54 has passed beyond the lip 72 to position the fastener 54 in the pre-installed position. The lip 72 assists in retaining the respective fasteners 54 inside of the opening 66 in the pre-installed position. In certain configurations, the first direction and the second direction are opposite of each other.

The fasteners 54 may be installed into the container 58 manually or installed in the container 58 by an automated process, or installed by any other suitable process. Once the containers 58 are reloaded, the machine 18 may repeat the above process for another location of the workpiece 12 or start this process over for another workpiece 12.

It is to be appreciated that the order or sequence of performing the method as described herein is for illustrative purposes and other orders or sequences are within the scope of the present teachings. It is to also be appreciated that the method may include other features described herein.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The following Clauses provide some example configurations of the fastener installation assembly 56, the end-effector tool 16, and the method as disclosed herein.

Clause 1: A fastener installation assembly for installing a plurality of fasteners into respective holes of a workpiece, the fastener installation assembly comprising: a container; a plurality of retainer assemblies supported by the container, wherein each of the retainer assemblies include a plurality of fingers configured to retain a respective one of the fasteners between the fingers in a pre-installed position; a first actuator disposed proximal to the container and configured to move the respective fasteners to an installed position by ejecting the respective one of the fasteners out of the respective retainer assemblies and inserting the respective one of the fasteners into one of the holes of the workpiece; and wherein each of the retainer assemblies include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

Clause 2: The fastener installation assembly as set forth in clause 1 wherein: the plurality of fingers of each of the retainer assemblies are further defined as a first finger and a second finger disposed adjacent to each other; and the first finger and the second finger of each of the retainer assemblies include an inward surface facing each other to define an opening therebetween, and the opening of each of the retainer assemblies is configured to receive the respective one of the fasteners in the pre-installed position.

Clause 3: The fastener installation assembly as set forth in clause 1 or 2 wherein: the first finger and the second finger of each of the retainer assemblies include a first end and a second end spaced from each other along a longitudinal axis; the second end of the first finger and the second end of the second finger of each of the retainer assemblies is disposed closer to the workpiece that the first end of the first finger and the first end of the second finger of each of the retainer assemblies; and the opening is disposed along the longitudinal axis.

Clause 4: The fastener installation assembly as set forth in clause 2 or 3 wherein: the inward surface of the first finger and the inward surface of the second finger of each of the retainer assemblies includes a lip extending into the respective opening; and the lip of the first finger and the second finger of each of the retainer assemblies cooperate to retain the respective one of the fasteners in the pre-installed position.

Clause 5: The fastener installation assembly as set forth in clause 4 wherein the lip of each of the retainer assemblies is disposed closer to the first end of the respective first finger and the respective second finger than to the second end of the respective first finger and the respective second finger.

Clause 6: The fastener installation assembly as set forth in any one of clauses 2-4 wherein the inward surface of the first finger and the second finger of each of the retainer assemblies includes a guide extending into the opening, and the guide is configured to open the first finger and the second finger of each of the retainer assemblies to receive the respective one of the fasteners as the respective one of the fasteners is inserted into the respective opening from a first direction to dispose the respective one of the fasteners in the pre-installed position.

Clause 7: The fastener installation assembly as set forth in clause 6 wherein the guide of each of the retainer assemblies is disposed closer to the second end of the respective first finger and the respective second finger than to the first end of the respective first finger and the respective second finger.

Clause 8: The fastener installation assembly as set forth in clause 6 or 7 wherein the first finger and/or the second finger of each of the retainer assemblies includes a stop that limits movement of the respective one of the fasteners in the first direction.

Clause 9: The fastener installation assembly as set forth in clause 8 wherein the stop is disposed at the first end of the first finger and at the first end of the second finger to partially close the opening at the first end.

Clause 10: The fastener installation assembly as set forth in any one of the preceding clauses wherein: the first finger and the second finger of each of the retainer assemblies include an outward surface that faces away from the respective opening; and the compliance apparatus is coupled to the outward surface to allow the first finger and the second finger of each of the retainer assemblies to move independently of each other when the respective one of the fasteners moves between the pre-installed position and the installed position.

Clause 11: The fastener installation assembly as set forth in any one of the preceding clauses wherein: the compliance apparatus of each of the retainer assemblies includes a first arm supporting the respective first finger and a second arm supporting the respective second finger; and the respective first finger is rotatable relative to the respective first arm and the respective second finger is rotatable relative to the respective second arm to allow the respective one of the fasteners to self-align with the respective one of the holes as the respective one of the fasteners moves from the pre-installed position to the installed position.

Clause 12: The fastener installation assembly as set forth in any one of the preceding clauses wherein: the compliance apparatus of each of the retainer assemblies includes a first biasing plunger coupled to the respective first arm and a second biasing plunger coupled to the respective second arm; and the respective first biasing plunger is movable linearly relative to the respective first arm and the respective second biasing plunger is movable linearly relative to the respective second arm to allow compliance of the respective first finger and the respective second finger to allow the respective one of the fasteners to self-align relative to the respective one of the holes during movement from the pre-installed position to the installed position.

Clause 13: The fastener installation assembly as set forth in any one of the preceding clauses wherein: the container includes a first wall and a second wall spaced from each other, and each of the retainer assemblies are disposed between the first wall and the second wall; and the first arm of each of the retainer assemblies is attached to the first wall and the second arm of each of the retainer assemblies is attached to the second wall.

Clause 14: The fastener installation assembly as set forth in any one of the preceding clauses: further including a bracket disposed proximal to the container and the first actuator is attached to the bracket; and wherein the bracket or the container is movable to an actuated position, and the other one of the bracket or the container is in a fixed position.

Clause 15: The fastener installation assembly as set forth in clause 14 wherein the container is movable to the actuated position and the bracket is disposed in the fixed position such that the container is movable relative to the bracket to the actuated position.

Clause 16: The fastener installation assembly as set forth in clause 14 or 15 further including a second actuator attached to the bracket and operatively coupled to the container, and the second actuator is configured to move the container to the actuated position to cycle the respective one of the fasteners of each of the retainer assemblies to align with the first actuator.

Clause 17: The fastener installation assembly as set forth in any one of clauses 14-16 wherein: the first actuator includes a housing fixed to the bracket and a rod movable relative to the housing from an initial position to an extended position to eject the respective one of the fasteners from the respective retainer assemblies to the installed position.

Clause 18: The fastener installation assembly as set forth in any one of clauses 14-17 wherein: the plurality of fingers of each of the retainer assemblies are further defined as a first finger and a second finger disposed adjacent to each other to define an opening therebetween; the container defines a plurality of access apertures spaced from each other, and each of the access apertures align with the respective opening of the retainer assemblies; and the rod aligns with one of the access apertures such that the rod is movable through the access aperture and into the respective opening to eject the respective one of the fasteners from the respective retainer assemblies and insert the respective one of the fasteners in the respective one of the holes of the workpiece in the installed position.

Clause 19: An end-effector tool for installing a plurality of fasteners into respective holes of a workpiece, the end-effector tool comprising: a fixture; and a plurality of fastener installation assemblies attached to the fixture in a predetermined pattern, wherein each of the fastener installation assemblies include: a container; a plurality of retainer assemblies supported by the container, wherein each of the retainer assemblies include a plurality of fingers configured to retain a respective one of the fasteners between the fingers in a pre-installed position; a first actuator disposed proximal to the container and configured to move the respective fasteners to an installed position by ejecting the respective one of the fasteners out of the respective retainer assemblies and inserting the respective one of the fasteners into one of the holes of the workpiece; and wherein each of the retainer assemblies include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

Clause 20: A method of installing a plurality of fasteners into respective holes of a workpiece, the method comprising: installing one of the fasteners in each of a plurality of retainer assemblies of a container of a fastener installation assembly in a pre-installed position, wherein each of the retainer assemblies include a plurality of fingers configured to retain a respective one of the fasteners between the fingers in the pre-installed position; aligning one of the fasteners relative to one of the holes of the workpiece; operating a first actuator to eject the respective one of the fasteners out of the respective retainer assemblies, wherein the first actuator is disposed proximal to the container; and inserting the respective one of the fasteners into one of the holes of the workpiece to an installed position via the first actuator, wherein each of the retainer assemblies include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

Clause 21: The method as set forth in clause 20 wherein inserting the respective one of the fasteners into one of the holes further comprises adjusting an orientation of the respective one of the fasteners relative to the respective one of the holes, via the compliance apparatus, to self-align the respective one of the fasteners during insertion into the respective one of the holes.

Clause 22: The method as set forth in clause 20 or 21 wherein each of the fasteners are installed into an opening between the respective fingers of the respective retainer assemblies in a first direction to retain the fasteners in the pre-installed position, and wherein each of the fasteners are ejected out of the opening of the respective retainer assemblies in a second direction to dispose the fasteners in the installed position, wherein the first direction and the second direction are opposite of each other.

Clause 23: The method as set forth in any one of clauses 20-22 wherein installing one of the fasteners in each of the retainer assemblies further comprises inserting each of the fasteners into the opening between the respective fingers of the respective retainer assemblies until the respective fasteners passes a lip that retains the respective fasteners inside of the respective opening.

Clause 24: The method as set forth in any one of clauses 20-23 further comprising controlling operation of an end-effector tool, via a controller, such that the controller positions the end-effector tool relative to the workpiece to align one of the fasteners of the fastener installation assembly with one of the holes, and wherein operating the first actuator further comprises operating the first actuator via the controller.

What is claimed is:

1. A fastener installation assembly for installing a plurality of fasteners into respective holes of a workpiece, the fastener installation assembly comprising:
   a container;
   a plurality of retainer assemblies supported by the container, wherein each of the retainer assemblies include a plurality of fingers configured to retain a respective one of the fasteners between the fingers in a pre-installed position;
   a first actuator disposed proximal to the container and configured to move the respective fasteners to an installed position by ejecting the respective one of the fasteners out of the respective retainer assemblies and inserting the respective one of the fasteners into one of the holes of the workpiece; and
   wherein each of the retainer assemblies include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

2. The fastener installation assembly as set forth in claim 1 wherein:
   the plurality of fingers of each of the retainer assemblies are further defined as a first finger and a second finger disposed adjacent to each other; and
   the first finger and the second finger of each of the retainer assemblies include an inward surface facing each other to define an opening therebetween, and the opening of each of the retainer assemblies is configured to receive the respective one of the fasteners in the pre-installed position.

3. The fastener installation assembly as set forth in claim 2 wherein:
   the first finger and the second finger of each of the retainer assemblies include a first end and a second end spaced from each other along a longitudinal axis;
   the second end of the first finger and the second end of the second finger of each of the retainer assemblies is disposed closer to the workpiece than the first end of the first finger and the first end of the second finger of each of the retainer assemblies; and
   the opening is disposed along the longitudinal axis.

4. The fastener installation assembly as set forth in claim 3 wherein:
   the inward surface of the first finger and the inward surface of the second finger of each of the retainer assemblies includes a lip extending into the respective opening; and the lip of the first finger and the second finger of each of the retainer assemblies cooperate to retain the respective one of the fasteners in the pre-installed position.

5. The fastener installation assembly as set forth in claim 4 wherein the lip of each of the retainer assemblies is disposed closer to the first end of the respective first finger and the respective second finger than to the second end of the respective first finger and the respective second finger.

6. The fastener installation assembly as set forth in claim 3 wherein the inward surface of the first finger and the second finger of each of the retainer assemblies includes a guide extending into the opening, and the guide is configured to open the first finger and the second finger of each of the retainer assemblies to receive the respective one of the fasteners as the respective one of the fasteners is inserted into the respective opening from a first direction to dispose the respective one of the fasteners in the pre-installed position.

7. The fastener installation assembly as set forth in claim 6 wherein the guide of each of the retainer assemblies is disposed closer to the second end of the respective first finger and the respective second finger than to the first end of the respective first finger and the respective second finger.

8. The fastener installation assembly as set forth in claim 6 wherein the first finger and/or the second finger of each of the retainer assemblies includes a stop that limits movement of the respective one of the fasteners in the first direction.

9. The fastener installation assembly as set forth in claim 8 wherein the stop is disposed at the first end of the first finger and at the first end of the second finger to partially close the opening at the first end.

10. The fastener installation assembly as set forth in claim 2 wherein:
   the first finger and the second finger of each of the retainer assemblies include an outward surface that faces away from the respective opening; and
   the compliance apparatus is coupled to the outward surface to allow the first finger and the second finger of each of the retainer assemblies to move independently of each other when the respective one of the fasteners moves between the pre-installed position and the installed position.

11. The fastener installation assembly as set forth in claim 10 wherein:
   the compliance apparatus of each of the retainer assemblies includes a first arm supporting the respective first finger and a second arm supporting the respective second finger; and
   the respective first finger is rotatable relative to the respective first arm and the respective second finger is rotatable relative to the respective second arm to allow the respective one of the fasteners to self-align with the respective one of the holes as the respective one of the fasteners moves from the pre-installed position to the installed position.

12. The fastener installation assembly as set forth in claim 11 wherein:
   the compliance apparatus of each of the retainer assemblies includes a first biasing plunger coupled to the respective first arm and a second biasing plunger coupled to the respective second arm; and
   the respective first biasing plunger is movable linearly relative to the respective first arm and the respective second biasing plunger is movable linearly relative to the respective second arm to allow compliance of the respective first finger and the respective second finger to allow the respective one of the fasteners to self-align relative to the respective one of the holes during movement from the pre-installed position to the installed position.

13. The fastener installation assembly as set forth in claim 11 wherein:

the container includes a first wall and a second wall spaced from each other, and each of the retainer assemblies are disposed between the first wall and the second wall; and the first arm of each of the retainer assemblies is attached to the first wall and the second arm of each of the retainer assemblies is attached to the second wall.

14. The fastener installation assembly as set forth in claim 1:

further including a bracket disposed proximal to the container and the first actuator is attached to the bracket; and wherein the bracket or the container is movable to an actuated position, and the other one of the bracket or the container is in a fixed position.

15. The fastener installation assembly as set forth in claim 14 wherein the container is movable to the actuated position and the bracket is disposed in the fixed position such that the container is movable relative to the bracket to the actuated position.

16. The fastener installation assembly as set forth in claim 15 further including a second actuator attached to the bracket and operatively coupled to the container, and the second actuator is configured to move the container to the actuated position to cycle the respective one of the fasteners of each of the retainer assemblies to align with the first actuator.

17. The fastener installation assembly as set forth in claim 14 wherein:

the first actuator includes a housing fixed to the bracket and a rod movable relative to the housing from an initial position to an extended position to eject the respective one of the fasteners from the respective retainer assemblies to the installed position.

18. The fastener installation assembly as set forth in claim 17 wherein:

the plurality of fingers of each of the retainer assemblies are further defined as a first finger and a second finger disposed adjacent to each other to define an opening therebetween;

the container defines a plurality of access apertures spaced from each other, and each of the access apertures align with the respective opening of the retainer assemblies; and the rod aligns with one of the access apertures such that the rod is movable through the access aperture and into the respective opening to eject the respective one of the fasteners from the respective retainer assemblies and insert the respective one of the fasteners in the respective one of the holes of the workpiece in the installed position.

19. An end-effector tool for installing a plurality of fasteners into respective holes of a workpiece, the end-effector tool comprising:

a fixture; and a plurality of fastener installation assemblies attached to the fixture in a predetermined pattern, wherein each of the fastener installation assemblies include:

a container;

a plurality of retainer assemblies supported by the container, wherein each of the retainer assemblies include a plurality of fingers configured to retain a respective one of the fasteners between the fingers in a pre-installed position;

a first actuator disposed proximal to the container and configured to move the respective fasteners to an installed position by ejecting the respective one of the fasteners out of the respective retainer assemblies and inserting the respective one of the fasteners into one of the holes of the workpiece; and wherein each of the retainer assemblies include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

20. A method of installing a plurality of fasteners into respective holes of a workpiece, the method comprising:

installing one of the fasteners in each of a plurality of retainer assemblies of a container of a fastener installation assembly in a pre-installed position, wherein each of the retainer assemblies include a plurality of fingers configured to retain a respective one of the fasteners between the fingers in the pre-installed position;

aligning one of the fasteners relative to one of the holes of the workpiece;

operating a first actuator to eject the respective one of the fasteners out of the respective retainer assemblies, wherein the first actuator is disposed proximal to the container; and inserting the respective one of the fasteners into one of the holes of the workpiece to an installed position via the first actuator, wherein each of the retainer assemblies include a compliance apparatus configured to allow the respective one of the fasteners and the respective fingers to move independently of each other to self-align the respective one of the fasteners with the respective one of the holes as the first actuator moves the respective one of the fasteners from the pre-installed position to the installed position.

21. The method as set forth in claim 20 wherein inserting the respective one of the fasteners into one of the holes further comprises adjusting an orientation of the respective one of the fasteners relative to the respective one of the holes, via the compliance apparatus, to self-align the respective one of the fasteners during insertion into the respective one of the holes.

22. The method as set forth in claim 20 wherein each of the fasteners are installed into an opening between the respective fingers of the respective retainer assemblies in a first direction to retain the fasteners in the pre-installed position, and wherein each of the fasteners are ejected out of the opening of the respective retainer assemblies in a second direction to dispose the fasteners in the installed position, wherein the first direction and the second direction are opposite of each other.

23. The method as set forth in claim 22 wherein installing one of the fasteners in each of the retainer assemblies further comprises inserting each of the fasteners into the opening between the respective fingers of the respective retainer assemblies until the respective fasteners passes a lip that retains the respective fasteners inside of the respective opening.

24. The method as set forth in claim 20 further comprising controlling operation of an end-effector tool, via a controller, such that the controller positions the end-effector tool relative to the workpiece to align one of the fasteners of the fastener installation assembly with one of the holes, and wherein operating the first actuator further comprises operating the first actuator via the controller.

\* \* \* \* \*